(12) United States Patent
Wong et al.

(10) Patent No.: US 6,720,864 B1
(45) Date of Patent: Apr. 13, 2004

(54) WIRELESS ON-CALL COMMUNICATION SYSTEM FOR MANAGEMENT OF ON-CALL MESSAGING AND METHOD THEREFOR

(75) Inventors: Poh-T'in Wong, Lake Worth, FL (US); Robert Edward Barratt, Boynton Beach, FL (US); Edward L. Ehmke, Wellington, FL (US)

(73) Assignee: Motorola, Inc., Schaumburg, IL (US)

( * ) Notice: Subject to any disclaimer, the term of this patent is extended or adjusted under 35 U.S.C. 154(b) by 422 days.

(21) Appl. No.: 09/624,402

(22) Filed: Jul. 24, 2000

(51) Int. Cl.[7] .............................. G08B 5/22; H04Q 1/30; H04Q 7/00
(52) U.S. Cl. .................... 340/7.52; 340/7.46; 340/7.43; 340/7.45
(58) Field of Search ............................. 340/7.52, 7.43, 340/7.5, 7.45, 7.47, 7.21, 7.23, 825.69, 825.72, 7.46, 10.32; 455/414.1

(56) References Cited

U.S. PATENT DOCUMENTS

| | | | |
|---|---|---|---|
| 5,539,395 A | * | 7/1996 | Buss et al. .................. 340/827 |
| 5,705,980 A | | 1/1998 | Shapiro |
| 5,831,545 A | | 11/1998 | Murray et al. |
| 5,949,866 A | * | 9/1999 | Coiera et al. ............... 379/210 |
| 6,263,209 B1 | * | 7/2001 | Reed et al. .................. 455/456 |
| 6,560,461 B1 | * | 5/2003 | Fomukong et al. ......... 455/456 |

* cited by examiner

Primary Examiner—Michael Horabik
Assistant Examiner—Vernal Brown
(74) Attorney, Agent, or Firm—Randi L. Karpinia

(57) ABSTRACT

A wireless communication device (32) within a wireless on-call communication system (10) includes a device receiver (92) for receiving an on-call message (36), a device processor (98) coupled to the device receiver (92) for processing the on-call message (36); a device memory (100) coupled to the device processor (98) for storing the on-call message (36); and an on-call application (108) coupled to the device processor (98) having an on-call schedule (80) for defining an active time period (126) and an inactive time period (128). The device processor (98) processes the on-call message (36) during the active time period (126) and discards the on-call message (36) during the inactive time period (128).

9 Claims, 16 Drawing Sheets

WIRELESS ON-CALL COMMUNICATION SYSTEM FOR MANAGEMENT OF ON-CALL MESSAGING AND METHOD THEREFOR

BACKGROUND OF THE INVENTION

1. Field of the Invention

This invention relates in general to wireless communication systems and in particular to wireless communication systems for managing on-call communication to a group of wireless communication devices.

2. Description of the Related Art

At present, when a person needs to contact a doctor on weekends and holidays, the standard procedure is to call the doctor's office and be connected to an answering service. The service takes down the caller's information and pages the doctor, who then calls either the answering service, or the person who called originally. The answering service must be provided with up-to-date contact information on each of the doctors involved, including which doctors are on call at a particular time. Typically there will be a group of doctors that rotate the on-call duty, dependent upon the day of the week and time of the day. Variations in who is on-call occur due to doctor illnesses, vacations, etc. Keeping up with these variations generally requires a coordinator to keep track of the changes and keep the answering service informed.

This situation also exists in other circumstances which require a person (or group of persons) to be on call to answer calls or queries or coordinate responses to an emergency situation such as public safety personnel, emergency response team personnel, and nuclear power station engineers.

One disadvantage with the current method is the turn-around time involved, which depends upon how busy the answering service is at a particular time, how many people they have employed, and the efficiency with which they perform. A second disadvantage with the current method is the difficulty in keeping up with roster changes, and the status of those on the roster. A third disadvantage with the current method is that the on-call doctors are limited in where they go and what they do while they are on-call. They cannot travel to neighboring cities outside a particular travel distance, unless they first clear this with the coordinator mentioned above, and the answering service is notified.

What is needed is an improved solution that automates the on-call management functionality, thereby eliminating the answering service middle layer, which will reduce the response time to calls. Further, a quick, reliable, and efficient method to make changes to the duty roster is also needed.

DETAILED DESCRIPTION OF THE INVENTION

Figure 1:
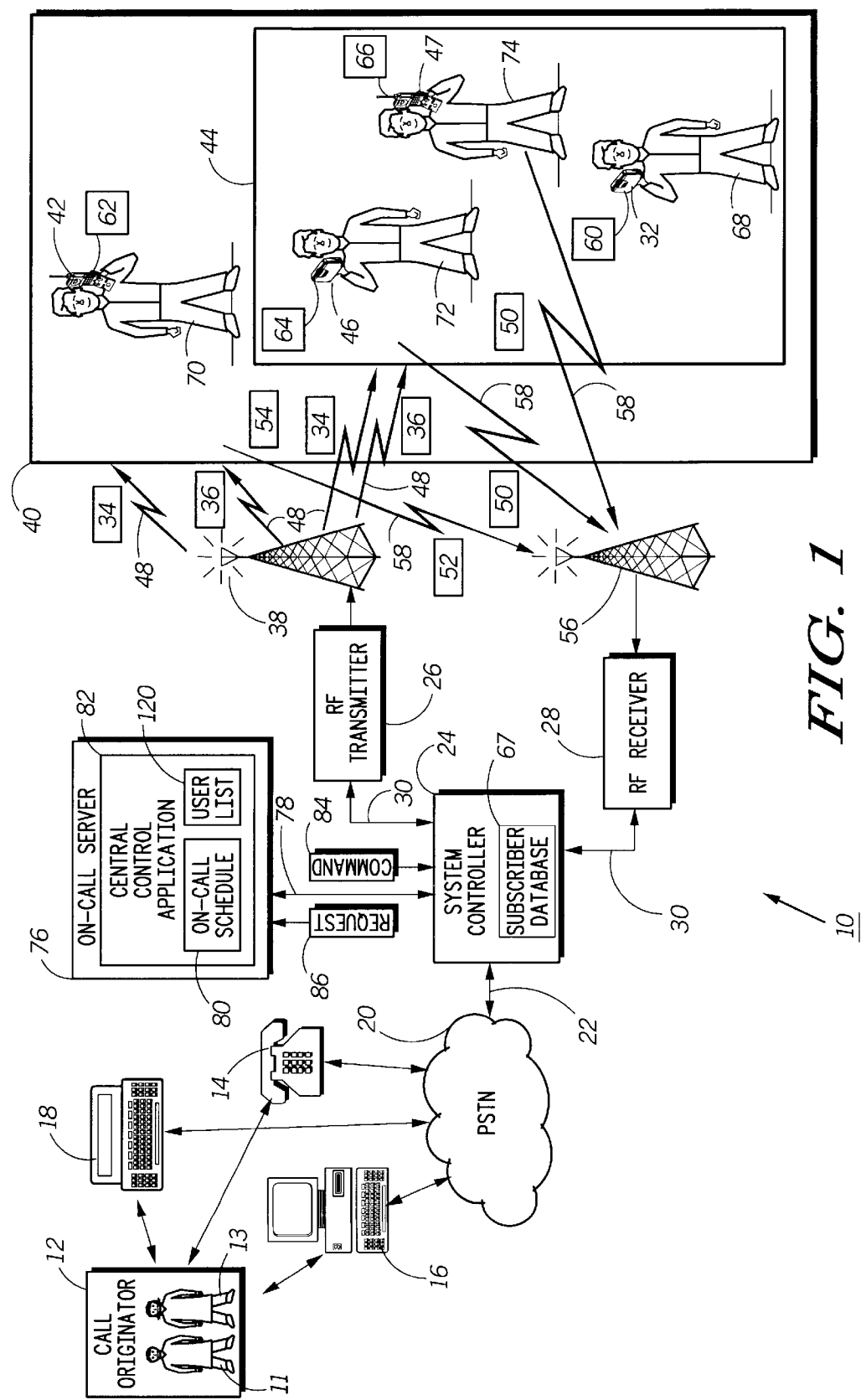
FIG. 1 is an electronic block diagram of a wireless on-call communication system.

Referring to FIG. 1, an electronic block diagram of a wireless on-call communication system 10 is shown. The wireless on-call communication system 10 includes a message input device receiving commands from a call originator 12 such as a patient 11 or a system administrator 13 and, in response, initiating messages into the wireless on-call communication system 10. The message input device can be, for example, a telephone 14, a computer 16, or a desktop messaging unit 18, connected through a conventional public switched telephone network (PSTN) 20 through a plurality of telephone links 22 to a system controller 24. The telephone links 22, for example, can be a plurality of twisted wire pairs, a fiber optic cable, or a multiplexed trunk line.

The system controller 24 is coupled to and oversees the operation of at least one radio frequency (RF) transmitter 26 and at least one radio frequency (RF) receiver 28 through one or more communication links 30. The communication links 30 typically are twisted pair telephone wires, and additionally can include radio frequency (RF), microwave, or other communication links. The radio frequency transmitter 26 and the radio frequency receiver 28 typically are used with message store and forward stations that encode and decode inbound and outbound messages into formats that are compatible with landline message switched computers and personal radio addressing requirements, such as cellular messages, short messaging service, or paging protocols. The system controller 24 can also function to encode and decode wireless messages that are transmitted to or received by the radio frequency transmitter 26 or the radio frequency receiver 28. Telephony signals are typically transmitted to and received from the system controller 24 by telephone sets such as the telephone 14 or a wireless communication device 32. The system controller 24 encodes and schedules outbound messages such as a message 34 or an on-call message 36. The system controller 24 then transmits the encoded outbound messages through the radio frequency transmitter 26 via a transmit antenna 38 to a plurality of wireless communication devices 40 such as an on-call wireless communication device 42, or a plurality of standby wireless communication devices 44 including the wireless communication device 32, a respondent wireless communication device 46, or a replacement wireless communication device 47 on at least one outbound radio frequency (RF) channel 48. The message 34 can be, for example, a data message or a voice call. Similarly, the system controller 24 receives and decodes inbound messages such as a reply message 50, a query message 52, or a change notification message 54 received by the radio frequency receiver 28 via a receive antenna 56 on at least one inbound radio frequency (RF) channel 58 from one of the plurality of wireless communication devices 40. The reply message 50, the query message 52, or the change notification message 54 can be, for example, a data message, a reply to a data message, a voice call, or a reply to a voice call.

It will be appreciated by one of ordinary skill in the art that the wireless on-call communication system 10, in accordance with the present invention, can function utilizing any wireless RF channel, for example, a one or two way pager channel, a mobile cellular telephone channel, or a mobile radio channel. Similarly, it will be appreciated by one of ordinary skill in the art that the wireless on-call communication system 10 can function utilizing other types of communication channels such as infrared channels. In the following description, the term "wireless on-call communication system" refers to any of the wireless on-call communication systems mentioned above or an equivalent.

Similarly, it will be appreciated by one of ordinary skill in the art that the wireless communication device 32, the on-call wireless communication device 42, the respondent wireless communication device 46, and the replacement wireless communication device 47 in accordance with the present invention, can be a mobile cellular telephone, a mobile radio data terminal, a mobile cellular telephone having an attached data terminal, or a two way pager, such as the "Pagewriter 2000X" manufactured by Motorola Inc. of Schaumburg, Ill. In the following description, the term "wireless communication device" refers to any of the devices mentioned above or an equivalent.

The wireless communication device 32 assigned for use in the wireless on-call communication system 10 has an address 60 assigned thereto which is a unique selective call address in the wireless on-call communication system 10. Similarly, the on-call wireless communication device 42 assigned for use in the wireless on-call communication system 10 has an on-call address 62, the respondent wireless communication device 46 has a respondent address 64, and the replacement wireless communication device 47 has a replacement address 66 all assigned thereto which are unique selective call addresses in the wireless on-call communication system 10. It will be appreciated by one of ordinary skill in the art that other wireless communication devices assigned for use in the wireless on-call communication system 10 have an address assigned thereto which is a unique selective call address in the wireless on-call communication system 10.

The address 60 enables the transmission of the message 34 from the system controller 24 only to the wireless communication device 32 having that address 60, and identifies the messages and responses received at the system controller 24 from the wireless communication device 32. In one embodiment, each of the plurality of wireless communication devices 40 also has a pin number assigned thereto, the pin number being associated with a telephone number within the PSTN 20. A list of the assigned addresses and correlated telephone numbers for each wireless communication device is stored in the system controller 24 in the form of a subscriber database 67.

A device user 68 interacts with the wireless communication device 32 and utilizes it as a means of communication. Similarly, an on-call device user 70 interacts with the on-call wireless communication device 42 and utilizes it as a means of communication, a respondent device user 72 interacts with the respondent wireless communication device 46 and utilizes it as a means of communication, and a replacement device user 74 interacts with the replacement wireless communication device 47 and utilizes it as a means of communication. The group of device users typically is a group of people sharing on-call responsibilities such as a group of doctors in the same office.

In a preferred embodiment, the address 60, the on-call address 62, the respondent address 64, and the replacement address 66 are the same group address identifying the plurality of wireless communication devices 40 including the on-call wireless communication device 42 and the plurality of standby wireless communication devices 44 receiving the same message. For example, a group of device users sharing the responsibility to respond to calls share a common group address programmed into each of their individual wireless communication devices so that the call originator 12 has to call only one telephone number.

In a preferred embodiment of the present invention, the wireless on-call communication system 10 includes an on-call server 76 coupled to the system controller 24 via a server interface 78. The on-call server 76 controls and manages communication of the on-call message 36 to the plurality of wireless communication devices 40 in response to a multitude of unscheduled and scheduled events by sending wireless messages to the plurality of wireless communication devices 40. The on-call server 76 manages an on-call schedule 80 of which device user is on-call on a particular day or timeframe, facilitating management of the group of device users through communication with the plurality wireless communication devices 40. In one embodiment, the on-call server 76 receives inputs from the system administrator 13. Preferably, the on-call server 76 includes a central control application 82. The central control application 82 manages the on-call schedule 80 of which device user and wireless communication device would be on-call on a particular day and time. The central control application 82 preferably includes a user list 120. The user list 120 includes information on all participants in the on-call group. The on-call server 76 communicates the on-call schedule 80 and any associated information, tasks, or changes by sending a server command 84 via the server interface 78 to the system controller 24. The system controller 24, upon receipt of the server command 84 from the on-call server 76, transmits the on-call schedule 80, task, or change to the plurality of wireless communication devices 40. Further, the system controller 24 communicates a system request 86 to the on-call server 76 via the server interface 78 for changes to the on-call schedule 80, responsibilities, the user list 120, and other on-call features.

The addition of the on-call server 76 to the wireless on-call communication system 10 enhances the operation of the wireless on-call communication system 10 by adding intelligence for the management of the on-call schedule 80 for communication among and to the plurality of wireless communication devices 40.

Figure 2:
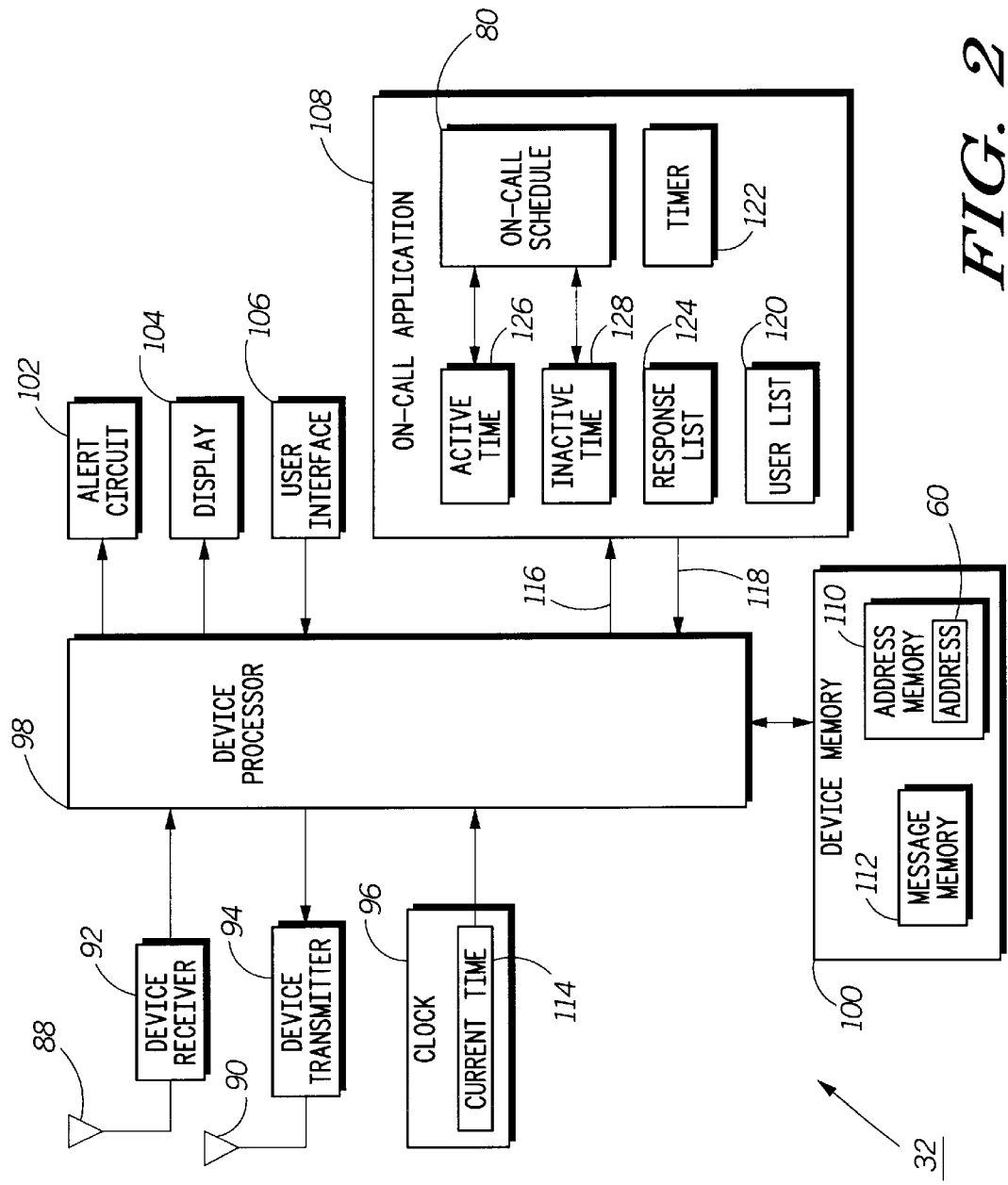
FIG. 2 is an electronic block diagram of a wireless communication device for use within the wireless on-call communication system of FIG. 1.

FIG. 2 is an electronic block diagram of a preferred embodiment of the wireless communication device 32 for use within the wireless on-call communication system 10. It will be appreciated by one of ordinary skill in the art that the electronic block diagram of FIG. 2 is illustrative of each of the plurality of wireless communication devices 40 assigned for use in the wireless on-call communication system 10 such as the on-call wireless communication device 42, the respondent wireless communication device 46, and the replacement wireless communication device 47.

Referring to FIG. 2, the wireless communication device 32 includes a first device antenna 88, a second device antenna 90, a device receiver 92, a device transmitter 94, a clock 96, a device processor 98, a device memory 100, an alert circuit 102, a display 104, a user interface 106, and an on-call application 108.

The first device antenna 88 intercepts transmitted signals from the wireless on-call communication system 10. The first device antenna 88 is coupled to the device receiver 92 which employs conventional demodulation techniques for receiving the communication signals transmitted by the wireless on-call communication system 10 such as the message 34 and the on-call message 36 of FIG. 1.

Coupled to the device receiver 92, is the device processor 98 utilizing conventional signal processing techniques for processing received messages.

Preferably, the device processor 98 is similar to the MC68328 micro-controller manufactured by Motorola, Inc. of Schaumburg, Ill. It will be appreciated by one of ordinary skill in the art that other similar processors can be utilized for the device processor 98, and that additional processors of the same or alternative type can be utilized as required to handle the processing requirements of the device processor 98.

The device processor 98 decodes an address in the demodulated data of the received message 34, compares the decoded address with one or more addresses such as the address 60 stored in an address memory 110 of the device memory 100; and when a match is detected, proceeds to process the remaining portion of the received message.

To perform the necessary functions of the wireless communication device 32, the device processor 98 is coupled to the device memory 100, which preferably includes a random access memory (RAM), a read-only memory (ROM), and an electrically erasable programmable read-only memory (EEPROM)(not shown). The device memory 100 also includes the address memory 110, and a message memory 112.

Once the device processor 98 has processed a received message, it stores the decoded message in the message memory 112. It will be appreciated by one of ordinary skill in the art that the message memory 112, in accordance with the present invention, can be a voicemail box or a group of memory locations in a data storage device. In the following description, the term "message memory" refers to any of the memory means mentioned above or an equivalent.

Upon receipt and processing of a message, the device processor 98 preferably generates a command signal to the alert circuit 102 to notify the device user 68 (see FIG. 1) that the message has been received and stored. The alert circuit 102 can include a speaker (not shown) with associated speaker drive circuitry capable of playing melodies and other audible alerts, a vibrator (not shown) with associated vibrator drive circuitry capable of producing a physical vibration, or one or more LEDs (not shown) with associated LED drive circuitry capable of producing a visual alert. It will be appreciated by one of ordinary skill in the art that other similar alerting means as well as any combination of the audible, vibratory, and visual alert outputs described can be used for the alert circuit 102.

Upon receipt of a message, the device processor 98 preferably also generates a command signal to the display 104 to generate a visual notification of the receipt and storage of the message 34. When the display 104 receives the command signal from the device processor 98 that the message has been received and stored in the message memory 112, a message indication is displayed. The message indication, for example can be the activation of one of a plurality of message icons on the display 104. The display 104 can be, for example, a liquid crystal display utilized to display text. It will be appreciated by one of ordinary skill in the art that other similar displays such as dot matrix displays can be utilized for the display 104.

In one embodiment, the wireless communication device 32 includes the clock 96. The clock 96 provides timing for the device processor 98. The clock 96 can include a current time 114 for use in the operation of the wireless communication device 32. The clock 96 also provides a source for timing of feature enhancements such as active and inactive periods of operation or periods of alerting.

In a preferred embodiment, the wireless communication device 32 includes the on-call application 108. The wireless communication device 32 performs on-call scheduling functions within the on-call application 108 using a processor command 116 sent from the device processor 98. The on-call application 108 sends an on-call application response 118 in reply to the processor command 116. The on-call application 108 preferably includes the user list 120 and the on-call schedule 80. The on-call application 108 can also include a timer 122 and a response list 124. The timer 122 and the response list 124 are used by the on-call application 108 in performing on-call scheduling functions. For example, the timer 122 can count down a predetermined time period for a requested action such as receiving the reply message 50 after the query message 52 is sent from the on-call wireless communication device 42. The response list 124 can be a table individually listing each of the plurality of standby wireless communication devices 44 and the messages received from each of the plurality of standby wireless communication devices 44 such as the reply message 50. The on-call application 108 can be hard coded or programmed into the wireless communication device 32 during manufacturing, can be programmed over-the-air upon customer subscription, or can be a downloadable application. It will be appreciated by one of ordinary skill in the art that other programming methods can be utilized for programming the on-call application 108 into the wireless communication device 32.

The on-call schedule 80, received from the on-call server 76 of the wireless on-call communication system 10 (see FIG. 1) identifies the on-call device user 70 and the on-call wireless communication device 42 for a particular day and time period. When the on-call schedule 80 dictates, the on-call responsibility changes from one wireless communication device to another, and the devices automatically switch from alerting to non-alerting, and vice versa. The on-call schedule 80 defines an active time period 126 and an inactive time period 128 for the wireless communication device 32. During the active time period 126, the wireless communication device 32 alerts upon receipt of the on-call message 36. During the inactive time period 128, the wireless communication device 32 can remain silent upon receipt of the on-call message 36 and is not required to store or completely process the received message. In one embodiment, the device processor 98 receives the current time 114 from the clock 96 and sends the processor command 116 including the current time 114 to the on-call application 108. The on-call application 108 compares the value of the current time 114 to the active time period 126 for the wireless communication device 32 as defined by the on-call schedule 80, and sends the on-call application response 118 when there is a match.

Preferably, the user interface 106 is coupled to the device processor 98, as shown in FIG. 2. The user interface 106 can be one or more buttons used to generate a button press, a series of button presses, a voice response from the device user 68, or some other similar method of manual response initiated by the device user 68 of the wireless communication device 32. The device processor 98, in response to the user interface 106, initiates the processor command 116 to the on-call application 108. The on-call application 108, in response to the processor command 116, performs various on-call functions as required.

The device transmitter 94 is coupled to the device processor 98 and is responsive to commands from the device processor 98. When the device transmitter 94 receives a command from the device processor 98, the device transmitter 94 sends a signal via the second device antenna 90 to the wireless on-call communication system 10.

In an alternative embodiment, the wireless communication device 32 includes one antenna performing the functionality of the first device antenna 88 and the second device antenna 90. Further, the wireless communication device 32 alternatively includes a transceiver circuit performing the functionality of the device receiver 92 and the device transmitter 94. It will be appreciated by one of ordinary skill in the art that other similar electronic block diagrams of the same or alternate type can be utilized for the wireless communication device 32 to handle the requirements of the wireless communication device 32.

Figure 3:
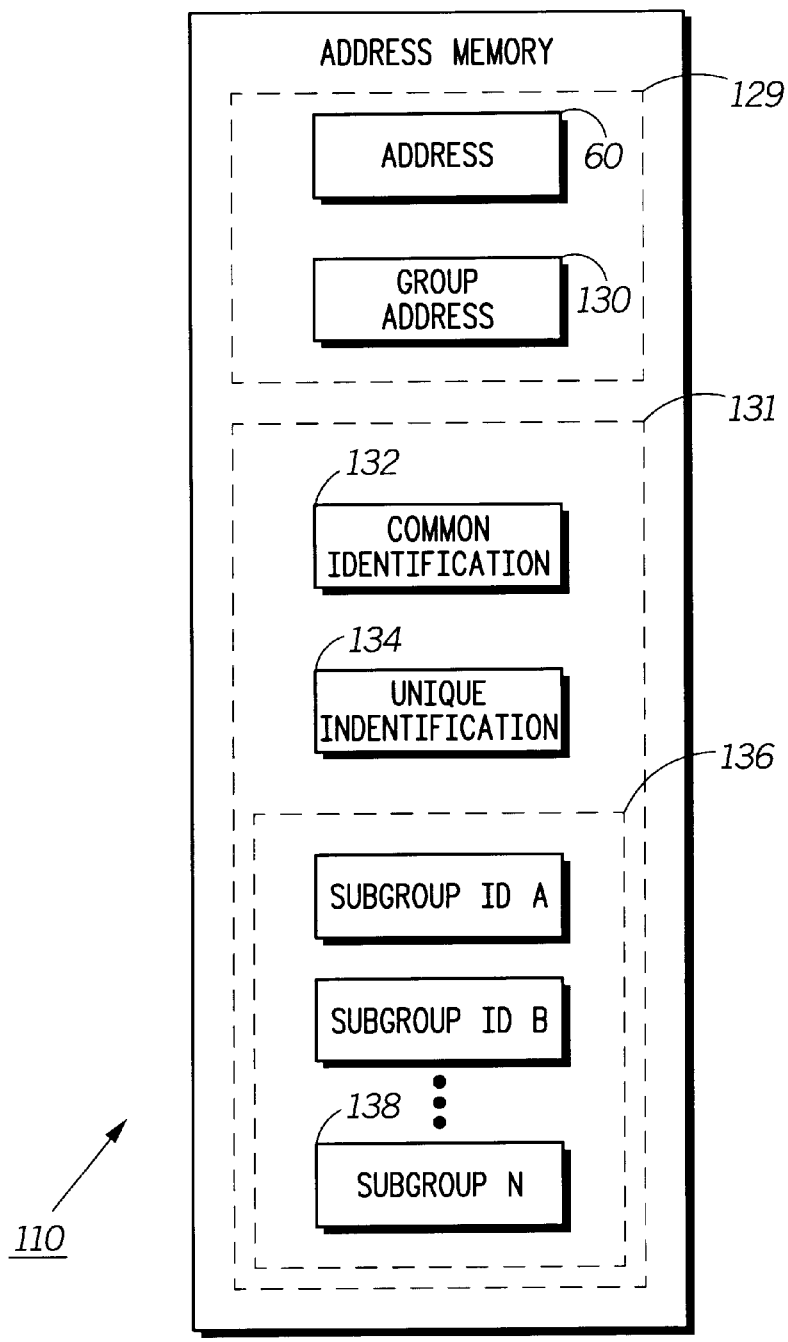
FIG. 3 illustrates one embodiment of an address memory for use within the wireless communication device of FIG. 2.

FIG. 3 illustrates one embodiment of the address memory 110 of the wireless communication device 32 (see FIG. 2). The address memory 110 stores one or more addresses as an identification of the wireless communication device 32. The address memory 110 preferably includes a plurality of addresses 129 such as the address 60, and a group address 130, and a plurality of identifications 131 such as a common identification 132, a unique identification 134, and one or more subgroup identifications 136 such as a subgroup identification 138. The address 60 as shown in FIG. 3 identifies the wireless communication device 32 by the system controller 24 (see FIG. 1) to receive a particular message. The group address 130 identifies the plurality of wireless communication devices 40 receiving the same message. The group address 130 can alternatively also be an information services address identifying another group of wireless communication devices receiving a plurality of messages on the same category of information. The common identification 132 is an additional tag, or sub-address, which can be sent as part of the overhead of the messages, sent on the group address 130 and can be common to all members of the group. The unique identification 134 is an additional tag, or sub-address, which can be sent as part of the overhead of the messages sent on the group call address. The subgroup identification 138 is an additional tag, or sub-address, which can be sent as part of the overhead of the messages sent on the group address 130 and can be common to subgroups of members within the entire original group.

Figure 4:
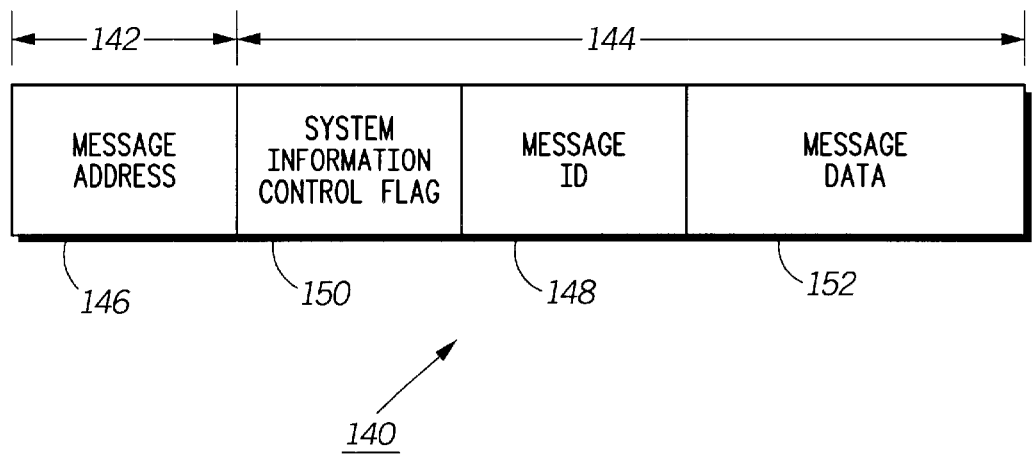
FIG. 4 illustrates a protocol for communicating within the wireless on-call communication system of FIG. 1 in accordance with the present invention.

FIG. 4 illustrates a protocol 140 for communicating to the plurality of wireless communication devices 40. This protocol 140 is embedded within the on-call message 36 sent to the plurality of wireless communication devices 40. The protocol 140 of FIG. 4 includes an address portion 142 and a data portion 144.

Referring to FIG. 4, the address portion 142 of the protocol 140 can include a message address 146. The message address 146 can be an address indicating that an ordinary page message follows, an address indicating that data to update the on-call schedule 80 follows, or an address indicating that data to change the on-call wireless communication device 42 follows. It will be appreciated by one of ordinary skill in the art that the message address 146 can be any of the addresses mentioned or an equivalent.

The data portion 144 of the protocol 140 of FIG. 4 can include a system information control flag 150, a message identification 148, and a message data 152. The system information control flag 150 indicates whether the following information contains system information (for example: on-call schedule changes) or a personal message. For example, when the system information control flag 150 is set to true, the remaining data portion 144 is on-call schedule data or on-call wireless communication device change data. Further, when the system information control flag 150 is set to false, the remaining data portion 144 is text data.

Figure 5:
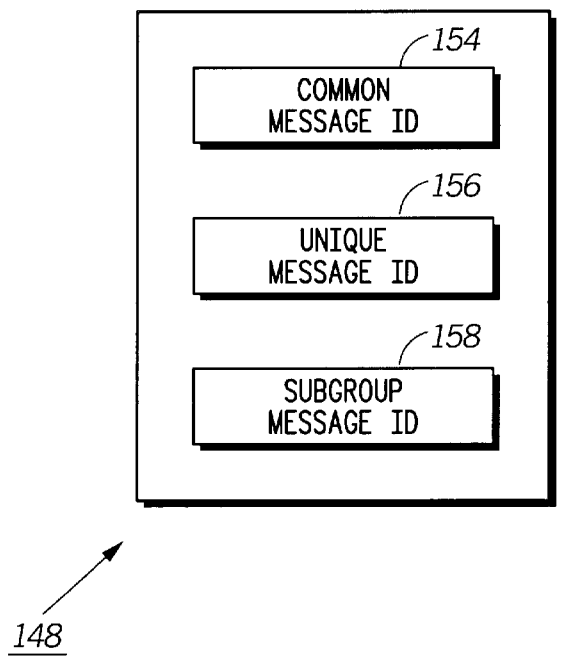
FIG. 5 illustrates several embodiments of a message identification for use within the protocol of FIG. 4.

As illustrated in FIG. 5, the message identification 148 can be a common message identification 154, a unique message identification 156, or a subgroup message identification 158. The common message identification 154 can be common to all members of a group. The unique message identification 156 can be unique to one wireless communication device of one member within the group. The subgroup message identification 158 can be common to a subgroup of wireless communication devices belonging to a subgroup of members within the entire original group.

Figure 6:
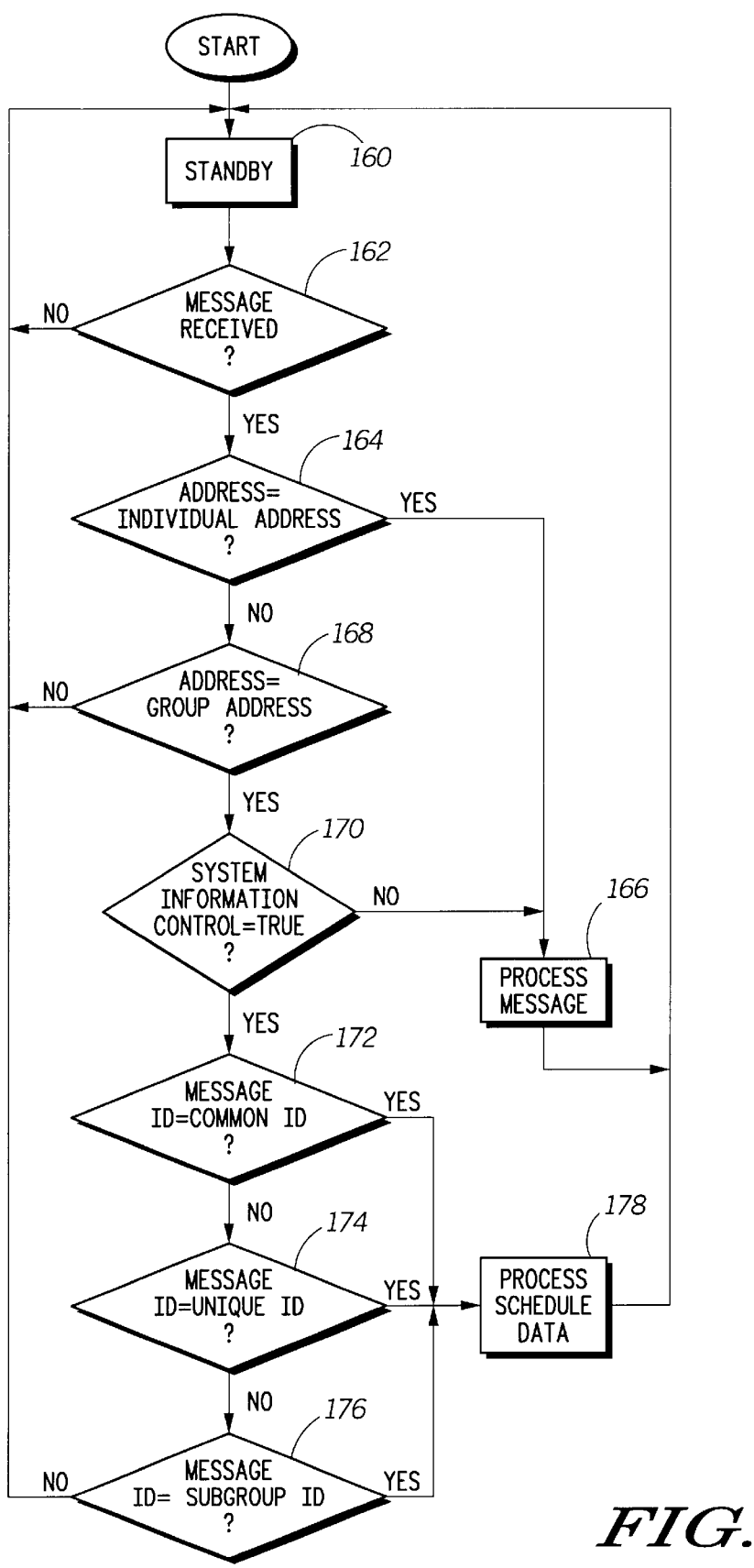
FIG. 6 is a flowchart illustrating one embodiment of the operation of the wireless communication device of FIG. 2 in accordance with the present invention.

FIG. 6 is a flowchart illustrating the operation of the wireless communication device 32 when the on-call message 36 is received including the protocol 140. It will be appreciated by one of ordinary skill in the art that the operation in FIG. 6 is illustrative of the operation of the plurality of wireless communication devices 40 assigned for use in the wireless on-call communication system 10.

In FIG. 6, the protocol 140 of FIG. 4 is utilized for communication of the on-call message 36. In Step 160, the wireless communication device 32 is in the standby operation. In Step 162, the device processor 98 queries for receipt of a message such as the message 34 or the on-call message 36. When no message is received, the wireless communication device 32 returns to the standby operation of Step 160. In Step 164, when a message is received, the device processor 98 checks for a match between the message address 146 of the received message and the address 60 stored in the address memory 110. In Step 166, when the message address 146 of the received message and the address 60 match, the device processor 98 processes the message as a standard wireless message by first storing the message in the message memory 112. The device processor 98 also sends a command to the alert circuit 102 to notify the device user 68 that the message has been received and stored. The notification can be playing melodies and other audible alerts, a physical vibration, or a visual alert. It will be appreciated by one skilled in the art that other notifications or any combination of the audible, vibratory, and visual alerts described can be used for the notification. Next, the device processor 98 sends a command to the display 104 to generate a visual notification of the receipt and storage of the message. When the display 104 receives the command from the device processor 98 that the message has been received and stored in the message memory 112, an indication is displayed. The wireless communication device 32 thereafter returns to the standby operation of Step 160.

Referring back to Step 164 of FIG. 6, when the message address 146 of the received message and the address 60 do not match, the process continues to Step 168. In Step 168, the device processor 98 checks for a match between the message address 146 of the received message and the group address 130 stored in the address memory 110. When the message address 146 of the received message and the group address 130 stored in the address memory 110 do not match, the wireless communication device 32 returns to the standby operation of Step 160. In Step 170, when the message address 146 of the received message and the group address 130 stored in the address memory 110 do match, the device processor 98 continues to process the received message by processing the system information control flag 150. In Step 166, when the system information control flag 150 is not true (false), the device processor 98 processes the message as a standard wireless message by first storing the message in the message memory 112. The device processor 98 also sends a command to the alert circuit 102 to notify the device user 68 that the message has been received and stored. The notification can be playing melodies and other audible alerts, a physical vibration, or a visual alert. One skilled in the art will appreciate that other notifications or any combination of the audible, vibratory, and visual alerts described can be used for the notification. Next, the device processor 98 sends a command to the display 104 to generate a visual notification of the receipt and storage of the message. When the display 104 receives the command from the device processor 98 that the message has been received and stored in the message memory 112, an indication is displayed. The wireless communication device 32 thereafter returns to the standby operation of Step 160.

Referring back to Step 170, when the system information control flag 150 is true, the process continues to Step 172. In Step 172, the device processor 98 compares the message identification 148 of the received message with the common identification 132 stored in the address memory 110. In Step 174, when the message identification 148 of the received message and the common identification 132 stored in the address memory 110 do not match, the device processor 98 compares the message identification 148 of the received message with the unique identification 134 stored in the address memory 110. In Step 176, when the message identification 148 of the received message and the unique identification 134 stored in the address memory 110 do not match, the device processor 98 compares the message identification 148 of the received message with the plurality of subgroup identifications 136 stored in the address memory 110. When the message identification 148 of the received message does not match with any of the plurality of subgroup identifications 136 stored in the address memory 110, the wireless communication device 32 returns to the standby operation of Step 160.

In Step 178, when the message identification 148 of the received message matches the common identification 132 in Step 172, or the unique identification 134 in Step 174, or the plurality of subgroup identifications 136 in Step 176, the device processor 98 processes the message data 152 of the received message as on-call schedule data. The device processor 98 sends the processor command 116 to the on-call application 108 including the message data 152 of the received message. The on-call application 108 then performs on-call-scheduling functions using the message data 152. For example, the on-call application 108 can update the user list 120 when the message data 152 includes the user list 120 with updated information, or the on-call application 108 can update the on-call schedule 80 when the message data 152 includes an updated on-call schedule 80. It will be appreciated by one skilled in the art that other on-call functions performed by the on-call application 108 are within the scope of the present invention. The wireless communication device 32 thereafter returns to the standby operation of Step 160.

Figure 7:
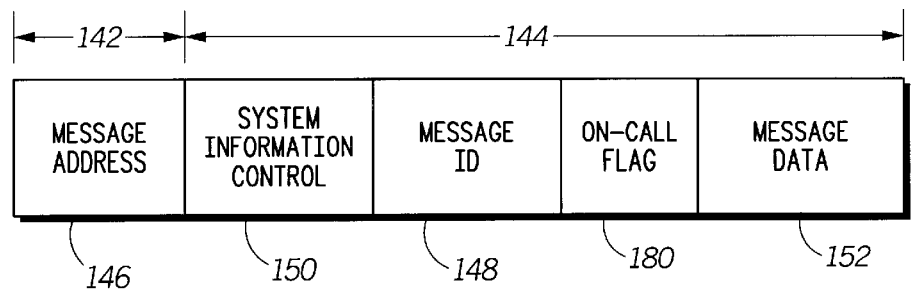
FIG. 7 illustrates an alternate embodiment of a protocol for communicating within the wireless on-call communication system of FIG. 1 in accordance with the present invention.

FIG. 7 illustrates an alternate embodiment of the protocol 140 for communicating within the wireless on-call communication system 10 to the plurality of wireless communication devices 40. The protocol 140 of FIG. 7 is embedded within the on-call message 36 sent to the plurality of wireless communication devices 40. The protocol 140 of FIG. 7 includes the address portion 142 and the data portion 144. The address portion 142 of the protocol 140 can include the message address 146. The data portion 144 of the protocol 140 of FIG. 7 can include the system information control flag 150, the message identification 148, an on-call flag 180 and the message data 152. The on-call flag 180 works in conjunction with the message identification 148; and is used to make momentary or temporary changes to the on-call schedule 80 without having to update the entire on-call schedule 80 and resend the on-call schedule 80 to the plurality of wireless communication devices 40.

Figure 8:
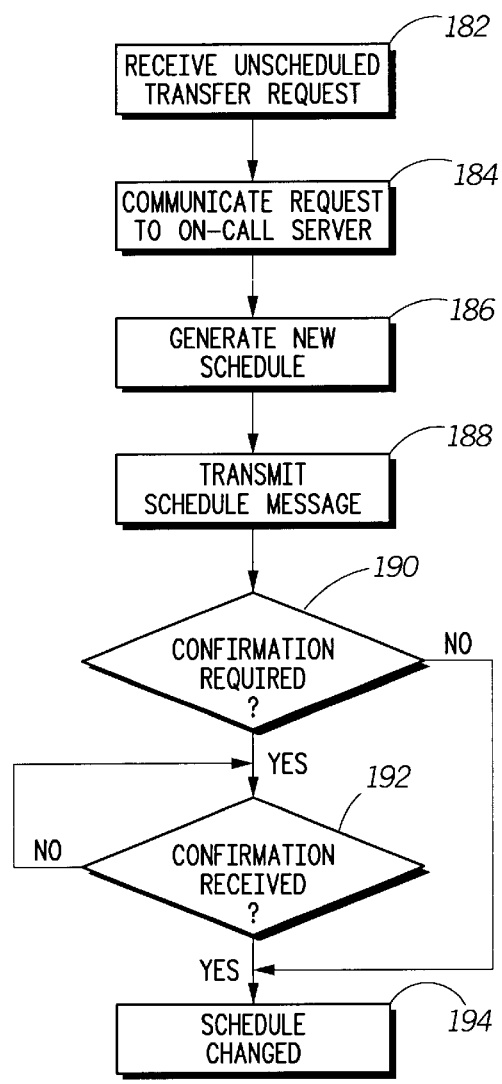
FIGS. 8 and 9 are flowcharts illustrating the operation of the wireless on-call communication system of FIG. 1 in accordance with the present invention.

FIG. 8 is a flowchart illustrating one method for the unscheduled transfer of on-call responsibility. It is desirable at times to make a system initiated, unscheduled transfer of the on-call responsibility from the on-call wireless communication device 42 to the replacement wireless communication device 47. In FIG. 8, the protocol 140 of FIG. 4 is utilized for communication of the on-call message 36. In Step 182, the system controller 24 of the wireless on-call communication system 10 (see FIG. 1) receives a request for an unscheduled transfer of on-call responsibility. The request for the unscheduled transfer of on-call responsibility can be initiated by the system administrator 13 via a message input device such as the telephone 14, the computer 16, or the desktop messaging unit 18. The request is communicated through the PSTN 20 through the plurality of telephone links 22 to the system controller 24. Alternatively, the unscheduled transfer request can be initiated by the on-call device user 70 via the on-call wireless communication device 42. The system controller 24 receives and decodes the unscheduled transfer request such as the change notification message 54 received by the radio frequency receiver 28 via the receive antenna 56 on at least one inbound RF channel 58 from the on-call wireless communication device 42. In Step 184, the system controller 24 communicates the system request 86 via the server interface 78 to the on-call server 76. In Step 186, the central control application 82 of the on-call server 76 generates a new on-call schedule 80 including the activation of the replacement wireless communication device 47 and the deactivation of the on-call wireless communication device 42 in response to receiving the system request 86 from the system controller 24. In Step 188, the new on-call schedule 80 is transmitted to the plurality of wireless communication devices 40. Preferably, the on-call server 76 communicates the server command 84 including the new on-call schedule 80 to the system controller 24 via the server interface 78. Upon receipt of the server command 84, the system controller 24 transmits the on-call message 36 to the plurality of wireless communication devices 40. The on-call message 36 includes the message data 152 having the new on-call schedule 80. Next, in Step 190, the on-call server 76 determines whether a confirmation is required. The confirmation is preferably the reply message 50 received by the radio frequency receiver 28 via the receive antenna 56 on at least one inbound RF channel 58 from the replacement wireless communication device 47 to the system controller 24 which communicates the confirmation to the on-call server 76 via the server interface 78. In Step 192, when a confirmation is required, the on-call server 76 queries whether the confirmation is received. When the confirmation is not received, the on-call server 76 continues to periodically query for receipt. In Step 194, when a confirmation is not required, or when the confirmation is required and is received, the central control application 82 implements the new on-call schedule 80.

In summary, in the method of FIG. 8, the on-call schedule 80 is changed by the on-call server 76, and retransmitted to the plurality of wireless communication devices 40, using the common identification 132, to replace the current on-call schedule 80 in the plurality of wireless communication devices 40. All of the plurality of wireless communication devices 40 then operate under the new on-call schedule 80.

Figure 9:
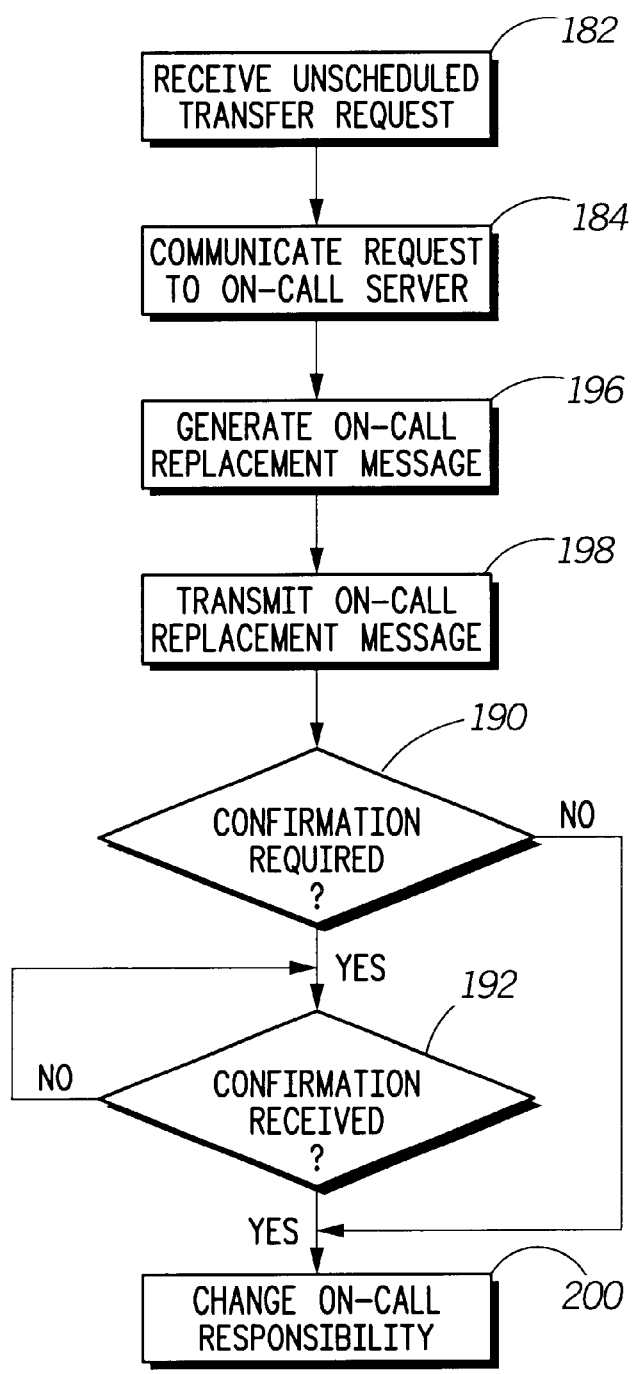

FIG. 9 is a flowchart illustrating an alternative embodiment of the unscheduled transfer of on-call responsibility. In FIG. 9, the protocol 140 of FIG. 7 is utilized for communication of the on-call message 36. In Step 182, the system controller 24 of the wireless on-call communication system 10 (see FIG. 1) receives a request for an unscheduled transfer of on-call responsibility. The request for an unscheduled transfer of on-call responsibility can be initiated in response to receiving a request from the on-call device user 70 by the system administrator 13 via a message input device such as the telephone 14, the computer 16, or the desktop messaging unit 18. The request is communicated through the PSTN 20 through the plurality of telephone links 22 to the system controller 24. Alternatively, the on-call device user 70 can initiate the unscheduled transfer request via the on-call wireless communication device 42. The system controller 24 receives and decodes the unscheduled transfer request such as the change notification message 54 received by the radio frequency receiver 28 via the receive antenna 56 on at least one inbound RF channel 58 from the on-call wireless communication device 42. In Step 184, the system controller 24 communicates the system request 86 via the server interface 78 to the on-call server 76. In Step 196, the central control application 82 of the on-call server 76 generates the on-call message 36 including the activation of the replacement wireless communication device 47 and the deactivation of the on-call responsibilities of the on-call wireless communication device 42 in response to receiving the system request 86 from the system controller 24. In Step 198, the on-call message 36 is transmitted to the plurality of wireless communication devices 40. Preferably, the on-call server 76 communicates the server command 84 including the new on-call schedule 80 to the system controller 24 via the server interface 78. Upon receipt of the server command 84, the system controller 24 transmits the on-call message 36 including the on-call flag 180 and the message identification 148 matching the unique identification 134 of the replacement wireless communication device 47. Next, in Step 190, the on-call server 76 determines whether a confirmation is required. The confirmation is preferably the reply message 50 received by the radio frequency receiver 28 via the receive antenna 56 on at least one inbound RF channel 58 from the replacement wireless communication device 47 to the system controller 24 which communicates the confirmation to the on-call server 76 via the server interface 78. In Step 192, when a confirmation is required, the on-call server 76 queries whether the confirmation is received. When the confirmation is not received, the on-call server 76 continues to periodically query for receipt. In Step 200, when a confirmation is not required, or when the confirmation is required and is received, the central control application 82 implements the change of on-call responsibilities for the requested time period. For example, when the on-call schedule 80 includes one or more on-call shifts, the requested time period can be the remainder of the current on-call shift; and the on-call responsibilities can be changed from the current time to the end of the on-call shift.

Figure 10:
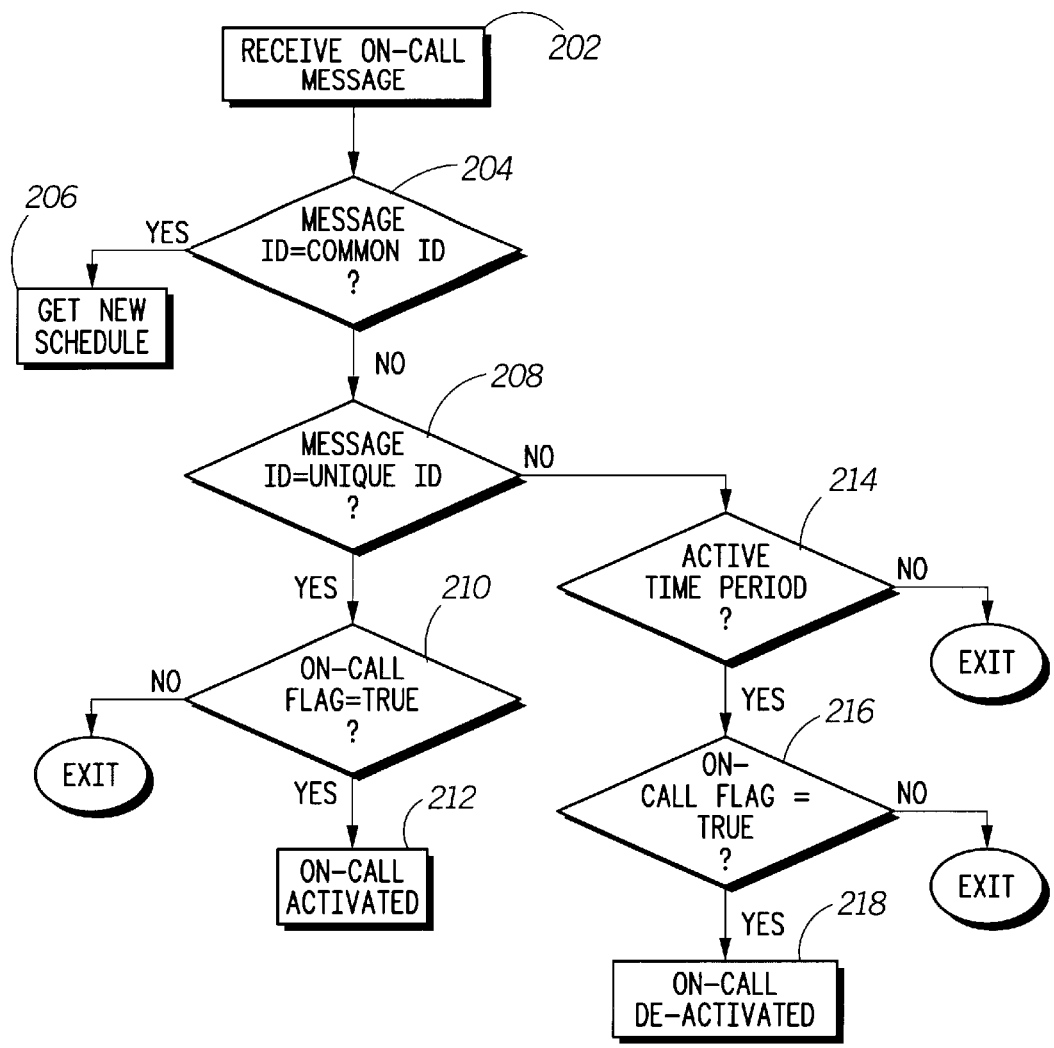
FIG. 10 is a flowchart illustrating one embodiment of the operation of the wireless communication device of FIG. 2 in accordance with the present invention.

FIG. 10 illustrates the operation of the wireless communication device 32 upon receipt of the on-call message 36 for the unscheduled transfer of on-call responsibility including the protocol 140 of FIG. 7 sent by the method illustrated in FIGS. 8 and 9. It will be appreciated by one of ordinary skill in the art that the operation in FIG. 10 is illustrative of the plurality of wireless communication devices 40 assigned for use in the wireless on-call communication system 10 such as the on-call wireless communication device 42, the respondent wireless communication device 46, and the replacement wireless communication device 47. In Step 202, the wireless communication device 32 receives the on-call message 36. Preferably, the message address 146 of the received on-call message 36 is the group address 130 stored in the address memory 110. Further, preferably, the system information control flag 150 of the received on-call message 36 is true. In Step 204, the device processor 98 of the wireless communication device 32 continues processing the on-call message 36 by comparing the message identification 148 of the received message with the common identification 132 stored in the address memory 110. In Step 206, when the message identification 148 of the received message matches the common identification 132, the device processor 98 continues to process the received message by processing the message data 152 of the received message as on-call schedule data. The device processor 98 sends the processor command 116 to the on-call application 108 including the message data 152 having on-call schedule information of the received message. The on-call application 108 then performs on-call-scheduling functions using the message data 152.

In Step 208, when the message identification 148 of the received on-call message 36 does not match the common identification 132, the device processor 98 compares the message identification 148 of the received message with the unique identification 134 stored in the address memory 110. In Step 210, when the message identification 148 of the received message and the unique identification 134 stored in the address memory 110 do match, the device processor 98 continues to process the received message by determining whether the on-call flag 180 of the received message is true. When the on-call flag 180 is false, the process exits. In Step 212, when the on-call flag 180 is true, the wireless communication device 32 is activated. Preferably, the device processor 98 sends the processor command 116 to the on-call application 108 including the command to set the active time period 126 to match the current time 114. The on-call application 108 sets the active time period 126 to match the current time 114 in response to the processor command 116.

In Step 214, when the message identification 148 of the received on-call message does not match the unique identification 134 stored in the address memory 110, the device processor 98 determines whether the on-call is activated. Preferably, the device processor 98 sends the processor command 116 to the on-call application 108 including the query of whether the active time period 126 matches the current time 114. The on-call application 108 sends the on-call application response 118 including whether the active time period 126 matches the current time 114 in reply to the processor command 116. When the on-call is not activated the process exits. In Step 216, when the on-call time is activated, the device processor 98 continues to process the received message by determining whether the on-call flag 180 of the received message is true. When the on-call flag 180 is false, the process exits. In Step 218, when the on-call flag 180 is true, the wireless communication device 32 is de-activated from on-call responsibilities. Preferably, the device processor 98 sends the processor command 116 to the on-call application 108 including the command to set the inactive time period 128 to match the current time 114. The on-call application 108 sets the inactive time period 128 to match the current time 114 in response to the processor command 116.

In summary, in the methods of FIGS. 9 and 10, a special message is transmitted utilizing the on-call flag 180 in conjunction with the unique identification of the replacement wireless communication device 47. The replacement wireless communication device 47 whose unique identification matches that contained in the special message would be enabled individually by the on-call flag 180. The on-call wireless communication device 42 would then go off-call when it sees the on-call flag 180 without its unique identification. The devices know that if someone else is on-call, they must be off-call. A change of this type only impacts the on-call schedule 80 until the end of the current shift. After that, the original on-call schedule 80 is in effect.

Figure 11:
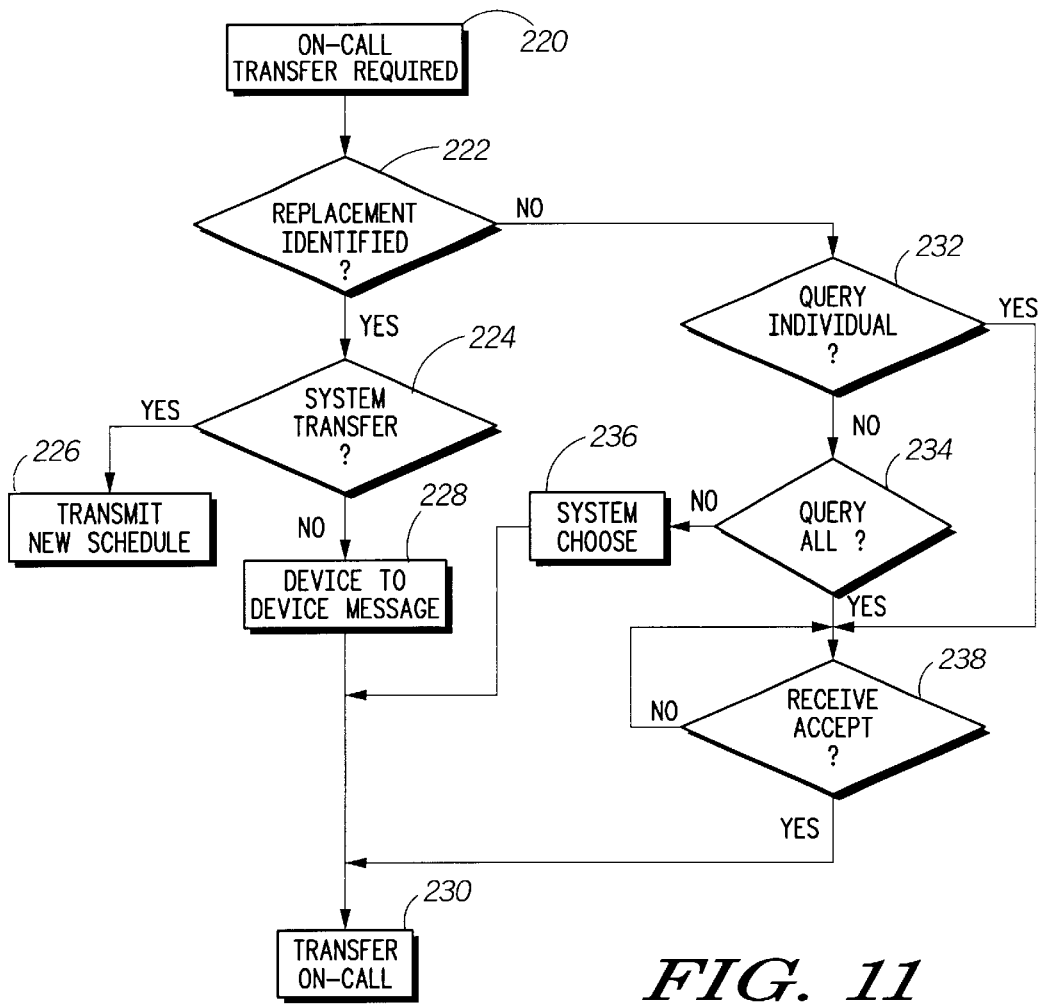
FIG. 11 is a flowchart illustrating one embodiment of the operation of the wireless on-call communication system of FIG. 1 in accordance with the present invention.

FIG. 11 is a flowchart illustrating a method within the wireless on-call communication system 10 for transferring the on-call responsibility when the on-call device user 70 is unable to continue in that role, and would need to transfer the on-call responsibility to the replacement device user 74 and the replacement wireless communication device 47. In Step 220, the on-call device user 70 requires the transfer of on-call responsibilities. This transfer is typically a temporary transfer for the remainder of an on-call period due to an emergency or other conflict for the on-call device user 70. In Step 222, the process queries whether the on-call device user 70 has already determined the replacement device user 74 that has agreed to assume the on-call responsibility. In Step 224, when the on-call device user 70 has already determined the replacement device user 74, the process queries whether a system transfer is requested. In Step 226, when a system transfer is requested, the on-call device user 70 communicates the change notification message 54 including the replacement wireless communication device 47 and preferably the replacement address 66. The change notification message 54 is received by the radio frequency receiver 28 via the receive antenna 56 on at least one inbound RF channel 58 and sent to the system controller 24 which communicates the change notification message 54 to the on-call server 76 via the server interface 78. In response to receiving the change notification message 54, the on-call server 76 updates the on-call schedule 80 and transmits the new on-call schedule 80 as described in FIG. 8 above. In Step 228, when a system transfer is not requested, the on-call device user 70 initiates a direct message to the replacement wireless communication device 47, which would cause the changes in the two wireless communication devices to be effected. For example, when the on-call wireless communication device 42 is active and the replacement wireless communication device 47 is inactive, the on-call device user 70 initiates an activation message to be transmitted to the replacement wireless communication device 47. The activation message is sent using the replacement address 66 of the replacement wireless communication device 47. Therefore, all other of the plurality of standby wireless communication devices 44 would not process the message. Next, in Step 230, inactivating the on-call wireless communication device 42 and activating the replacement wireless communication device 47 transfers the on-call responsibility. For example, when the on-call schedule 80 includes one or more on-call shifts, the on-call responsibilities can be changed from the current time to the end of the on-call shift.

In Step 232, when the on-call device user 70 does not identify the replacement device user 74, the process determines whether the on-call device user 70 sends a query to the replacement wireless communication device 47 as a request to take over the on-call function. The query could be a normal text message, or a system information type message, which would allow the replacement wireless communication device 47 to broadcast the on-call or off-call flag message effecting the changes. Ideally, this query would have set up the replacement wireless communication device 47 so that the replacement device user 74 presses one button to initiate the reply message 50. Alternatively, the query can be a normal text message, and the replacement wireless communication device 47 can respond to the on-call wireless communication device 42, and the on-call wireless communication device 42 would broadcast the transfer commands. In Step 234, when a query is not sent to the replacement wireless communication device 47 individually from the on-call wireless communication device 42, the process determines whether the on-call device user 70 sends a query to all the plurality of standby wireless communication devices 44. Preferably, the on-call device user 70 broadcasts a request to all the plurality of standby wireless communication devices 44, asking for a replacement. In Step 236, when no query of the plurality of standby wireless communication devices 44 is sent by the on-call device user 70 via the on-call wireless communication device 42, the on-call server 76 makes the change and transmits the new on-call schedule 80 as described previously in FIG. 8. In Step 238, when an individual query is sent in Step 232 or when all device users are queried in Step 234, the on-call device user 70 queries for receipt of the reply message 50 including an acceptance. When no reply message 50 including an acceptance is received, the process continues to query for acceptance. In Step 230, when the reply message 50 including an acceptance is received, the on-call wireless communication device 42 is inactivated and the replacement wireless communication device 47 is activated. For example, when the on-call schedule 80 includes one or more on-call shifts, the on-call wireless communication device 42 is inactivated and the replacement wireless communication device 47 is activated from the current time to the end of the on-call shift.

Figure 12:
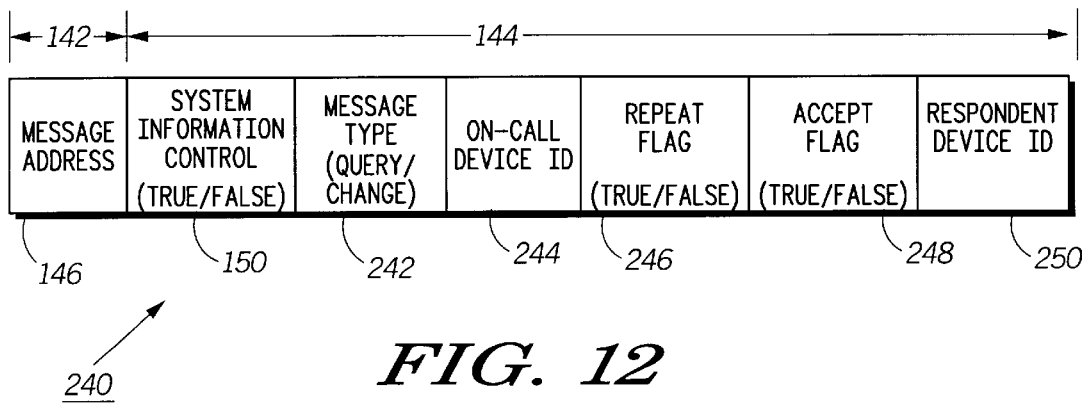
FIG. 12 illustrates one embodiment of a protocol for communicating within the wireless on-call communication system of FIG. 1 in accordance with the present invention.

FIG. 12 illustrates a query protocol 240 for communicating among the plurality of wireless communication devices 40. This query protocol 240 is embedded within the on-call message 36 sent to the plurality of wireless communication devices 40. The query protocol 240 of FIG. 12 includes the address portion 142 and the data portion 144. The address portion 142 of the query protocol 240 can include the message address 146. Preferably, the message address 146 is the group address 130 indicating the query message 52 is intended for the plurality of wireless communication devices 40. The message address 146 can be an address indicating that an ordinary page message follows, an address indicating that data to update the on-call schedule 80 follows, or an address identifying that data to change the on-call device follows. It will be appreciated by one of ordinary skill in the art that the message address 146 can be any of the addresses mentioned or an equivalent.

Preferably, the data portion 144 of the query protocol 240 of FIG. 12 includes the system information control flag 150, a message type 242, an on-call device identification 244, a repeat flag 246, an accept flag 248 and a respondent device identification 250. The system information control flag 150 indicates whether the following information contains system information (for example: on-call schedule changes) or a personal message. For example, when the system information control flag 150 is set to true, the message information is on-call schedule data or on-call device change data. Further, when the system information control flag 150 is set to false, the message information is text data. The message type 242 identifies for the receiving wireless communication device what type of information is to follow. For example, when the message type 242 is defined as a "query", the remaining data of the data portion 144 is a query request for a change of on-call responsibility. When the message type 242 is defined as a "change", the remaining data of the data portion 144 is the information to change the on-call responsibilities from the on-call wireless communication device 42 to the replacement wireless communication device 47. (refer to FIG. 7) The on-call device identification 244 is the unique identification 134 of the on-call wireless communication device 42 originating the query message 52. The repeat flag 246 indicates whether the query message 52 has been sent previously and is now being sent again. For example, when the repeat flag 246 is false, the query message 52 is new. When the repeat flag 246 is true, the query message 52 is a repeat message. The accept flag 248 is an indication of acceptance of the on-call responsibility. For example, a new query message 52 includes the accept flag 248 set to false. A response including an acceptance of the on-call responsibility includes the accept flag 248 set to true. The respondent device identification 250 is the unique identification 134 of the respondent wireless communication device 46.

Figure 13:
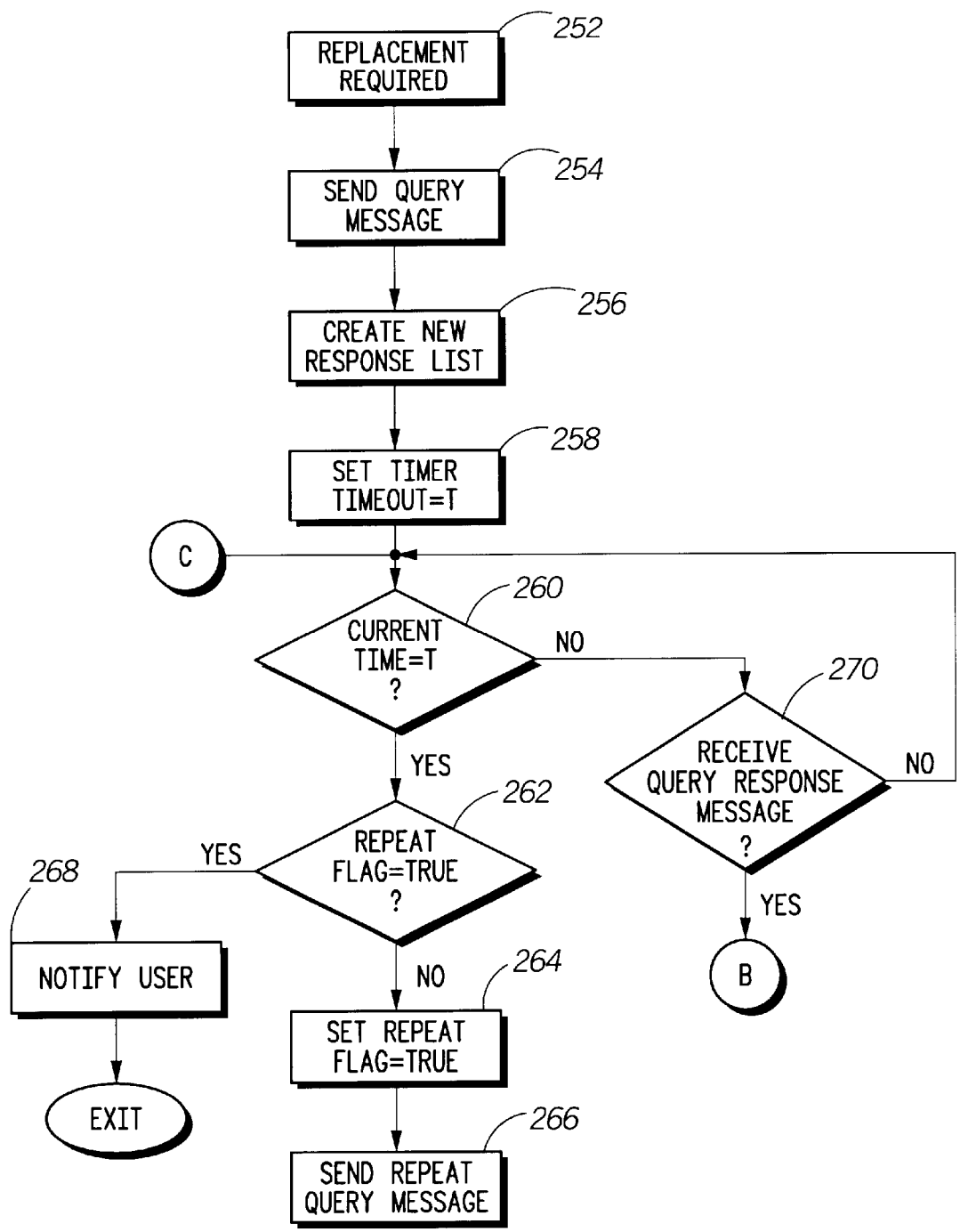
FIGS. 13, 14, 15 and 16 are flowcharts illustrating the operation of the wireless communication device of FIG. 2 in accordance with the present invention.

FIG. 13 is a flowchart illustrating the operation of the on-call wireless communication device 42 when the on-call device user 70 desires a replacement. The method of FIG. 13 uses the query protocol 240 illustrated in FIG. 12. In Step 252, a replacement is desired. In Step 254, the on-call wireless communication device 42 sends the query message 52 including the query protocol 240 (see FIG. 12). Preferably, in the query message 52, the message address 146 is the group address 130, the system information control flag 150 is set to true, the message type 242 is set to "query", the on-call device identification 244 is the unique identification 134 of the on-call wireless communication device 42 originating the query message 52, the repeat flag 246 is set to false, the accept flag 248 is set to false, and the respondent device identification 250 is cleared to null. Next, in Step 256, the on-call wireless communication device 42 creates the response list 124 in the on-call application 108. In Step 258, the on-call wireless communication device 42 inititializes the timer 122 in the on-call application 108. In Step 260, the device processor 98 of the on-call wireless communication device 42 checks if the current time 114 is equal to the timer 122. In Step 262, when the current time 114 equals the timer 122, the device processor 98 checks if the repeat flag 246 is set to true. In Step 264, when the repeat flag 246 is not set to true, the repeat flag 246 is set to true. In Step 266, a repeat of the query message 52 is sent from the on-call wireless communication device 42 to the plurality of standby wireless communication devices 44; and the process returns to Step 258 to reset the timer 122. In Step 268, when the repeat flag 246 is set to true, the on-call wireless communication device 42 notifies the on-call device user 70 that the timer 122 has timed out after the message was sent twice. Preferably, the device processor 98 sends a command to the alert circuit 102 to notify the on-call device user 70. The notification can be playing melodies and other audible alerts, a physical vibration, or a visual alert. It will be appreciated by one skilled in the art that other notifications or any combination of the audible, vibratory, and visual alerts described can be used for the notification. Next, the device processor 98 sends a command to the display 104 to generate a visual notification. When the display 104 receives the command from the device processor 98, an indication is displayed. The process then exits.

In Step 270, when the current time 114 is not equal to the timer 122 in Step 228, the device processor 98 checks for receipt of the on-call message 36 including the query protocol 240. When no message is received, the process returns to Step 260 and periodically checks whether the current time 114 is equal to the timer 122. When the on-call message 36 is received including the query protocol 240, the process proceeds to node "B" as illustrated in FIG. 14.

Figure 14:
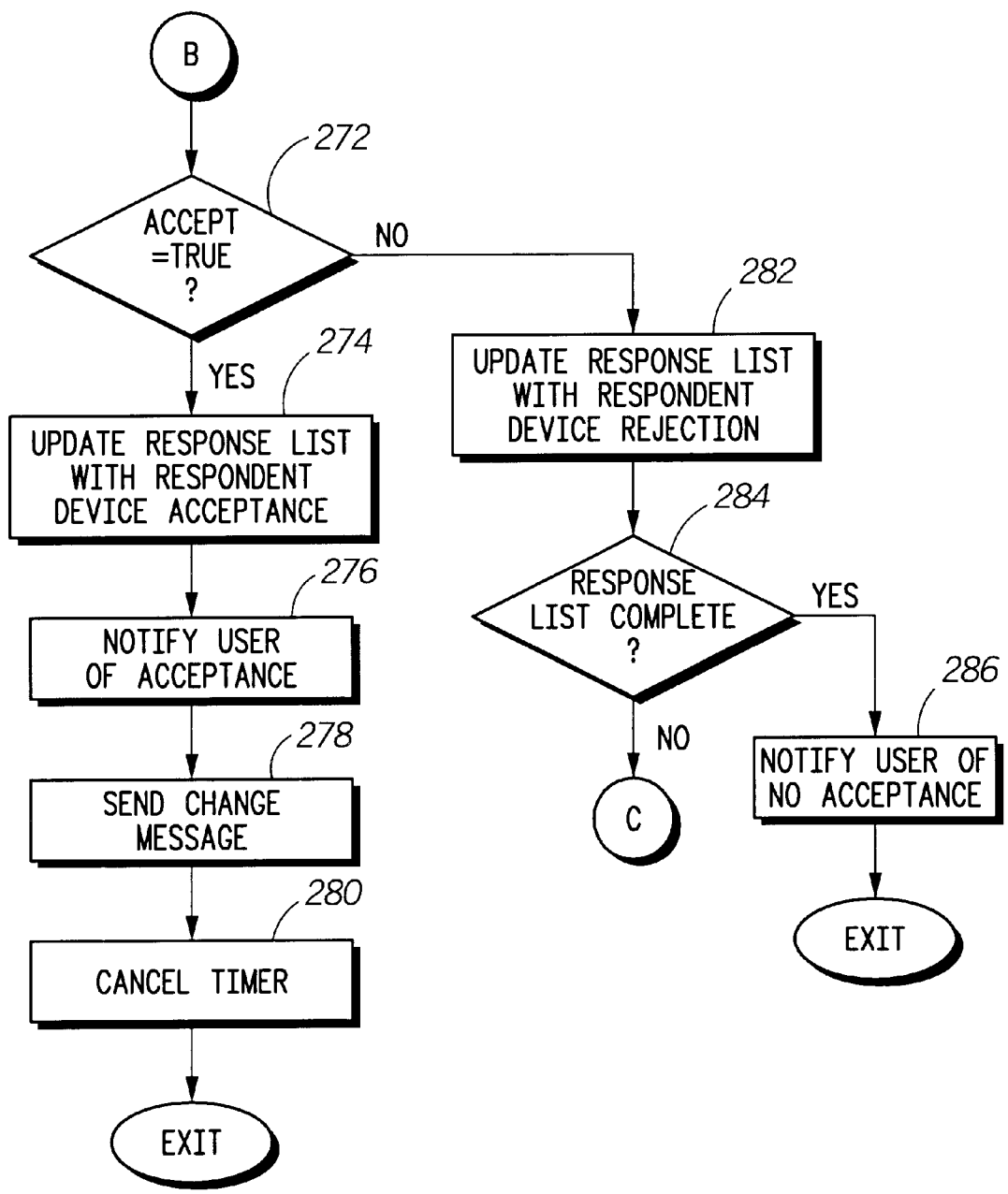

Referring to FIG. 14 the further operation of the on-call wireless communication device 42 when the reply message 50 is received is illustrated. The method of FIG. 14 uses the query protocol 240 illustrated in FIG. 12. In Step 272, the device processor 98 determines whether the accept flag 248 of the received reply message 50 is set to true. In Step 274, when the accept flag 248 is set to true, the device processor 98 continues processing the received reply message 50 by processing the respondent device identification 250. In Step 276, the device processor 98 notifies the on-call device user 70 of the acceptance by the respondent wireless communication device 46. In Step 278, the on-call wireless communication device 42 sends the change notification message 54 to the plurality of standby wireless communication devices 44 indicating the on-call schedule 80 change. Preferably, the change notification message 54 uses the protocol 140 illustrated in FIG. 7 whereby the message address 146 is the group address 130, the message identification 148 is the unique identification 134 of the accepting device, the system information control flag 150 is set to true, the on-call flag 180 is set to true, and the message data 152 is the change notification information. In Step 280, the timer 122 is cancelled. Preferably, the device processor 98 sends the processor command 116 to the on-call application 108 including the command to cancel the timer 122. The on-call application 108, in response to the processor command 116 cancels the timer 122. The process then exits.

In Step 282, when the accept flag 248 is set to false, the device processor 98 continues to process the received reply message 50 including the respondent device identification 250. The device processor 98 notifies the on-call application 108 that the respondent wireless communication device 46 has sent a rejection (acceptance is false). The on-call application 108 updates the response list 124 to indicate this. Next, in Step 284, the device processor 98 queries whether the response list 124 is complete. In Step 286, when the response list 124 is complete, the on-call wireless communication device 42 notifies the on-call device user 70 that the response list 124 is complete. The process then exits. When the response list 124 is not complete in Step 284, the process returns to node "C" of FIG. 13.

Figure 15:
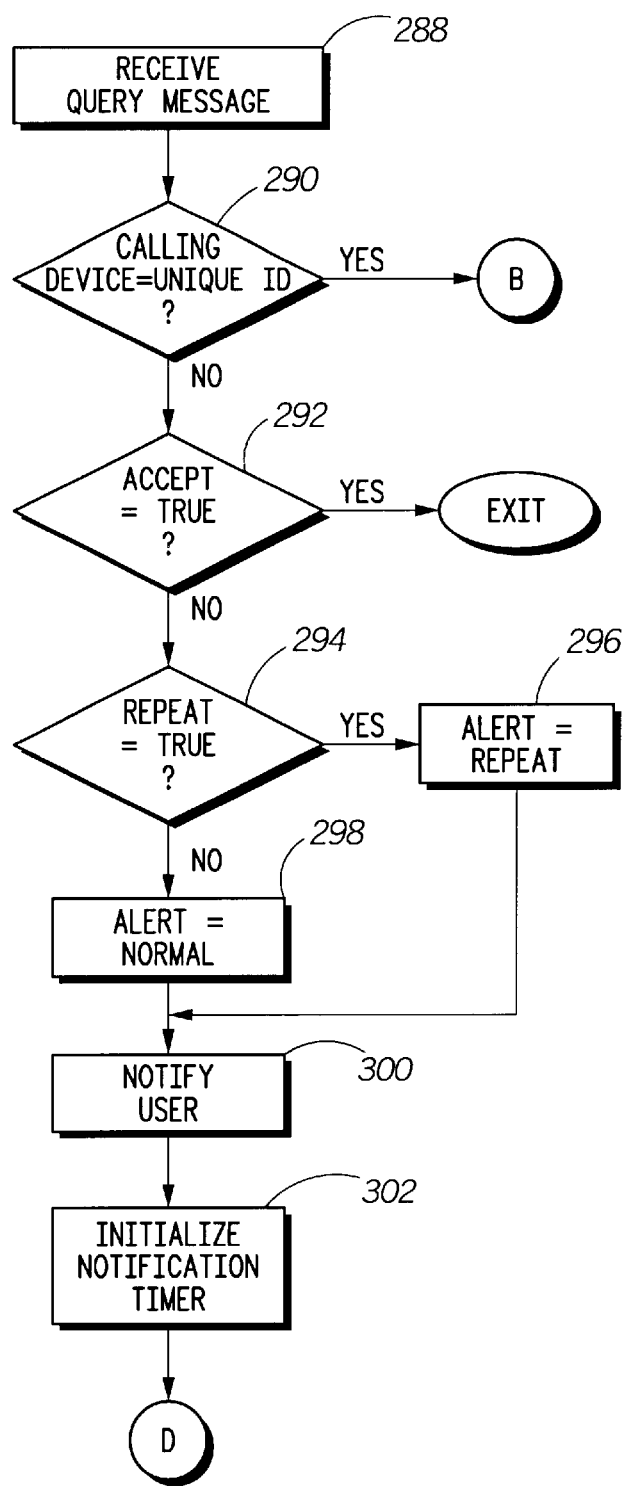

FIG. 15 is a flowchart illustrating the further operation of the plurality of standby wireless communication devices 44 such as the wireless communication device 32 and the respondent wireless communication device 46 in response to receiving the query message 52 including the query protocol 240 illustrated in FIG. 12. In Step 288, the wireless communication device 32 receives the query message 52. In Step 290, the device processor 98 compares the on-call device identification 244 with the unique identification 134 of the wireless communication device 32 and determines if they match. When the on-call device identification 244 matches the unique identification 134, the process proceeds to node "B" of FIG. 14. In Step 292, when the on-call device identification 244 does not match the unique identification 134, the device processor 98 continues processing the received query message 52 to determine if the accept flag 248 is true. When the accept flag 248 is true, the process exits. In Step 294, when the accept flag 248 is false, the device processor 98 continues to process the received query message 52 to determine if the repeat flag 246 is true. In Step 296, when the repeat flag 246 is true, the alert is set to a repeat alert. In Step 298, when the repeat flag 246 is false, the alert is set to a normal alert. In Step 300, the device user 68 is notified. Preferably, the device processor 98 sends a command to the alert circuit 102 to notify the on-call device user 70. The notification can be playing melodies and other audible alerts, a physical vibration, or a visual alert. It will be appreciated by one skilled in the art that other notifications or any combination of the audible, vibratory, and visual alerts described can be used for the notification. Next, the device processor 98 sends a command to the display 104 to generate a visual notification. When the display 104 receives the command from the device processor 98, an indication is displayed. In Step 302, the timer 122 is initialized. The process then continues to node D of FIG. 16.

Figure 16:
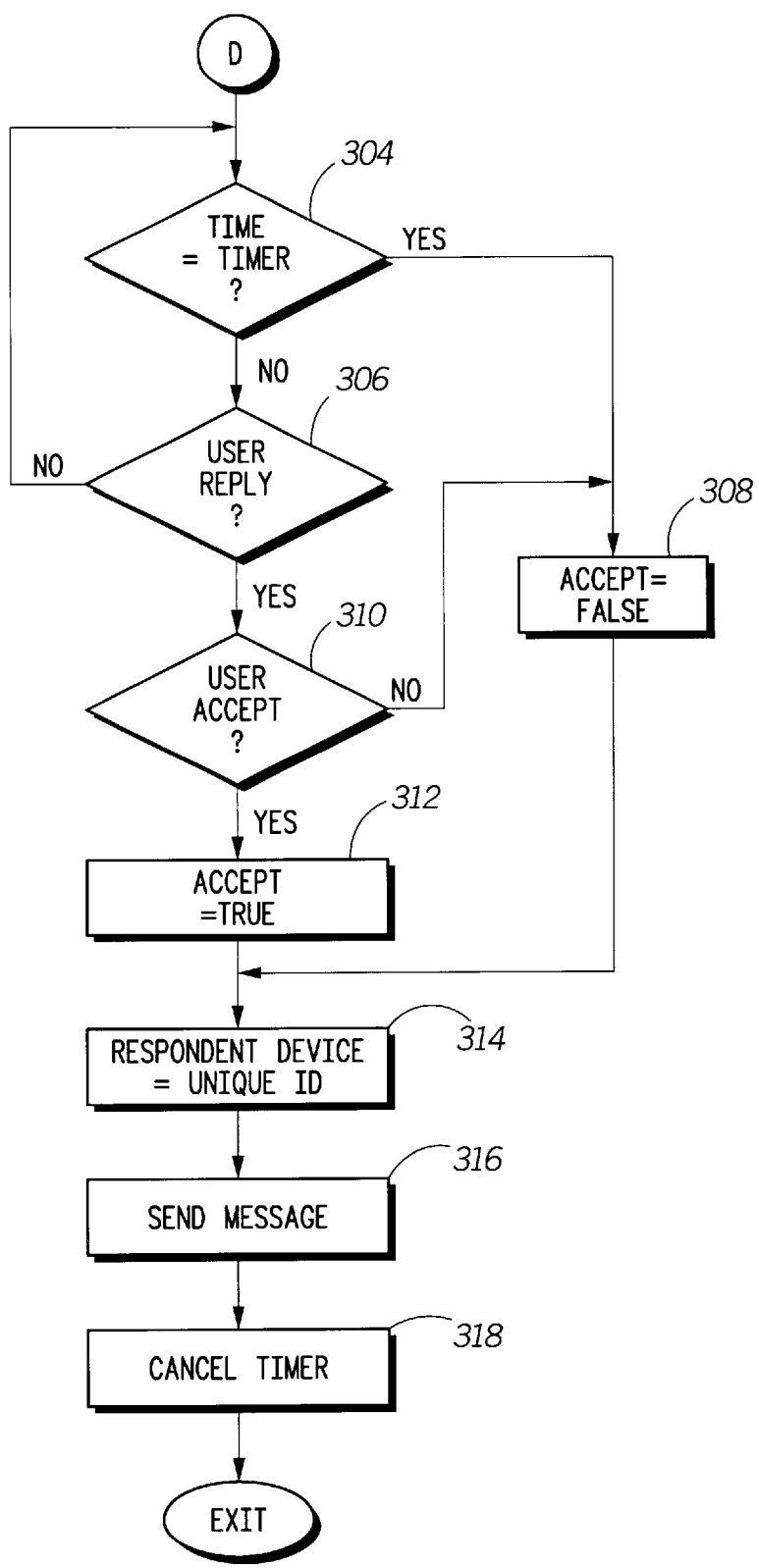

Referring to FIG. 16, in Step 304, the device processor 98 determines if the current time 114 equals the timer 122. In Step 306, when the current time 114 does not equal the timer 122 the device processor 98 checks for a user reply of the query. When no user reply is detected, the process returns to Step 304 and periodically checks whether the current time 114 equals the timer 122. In Step 310, the device processor 98 checks for a user acceptance of the query message 52. In Step 308, when the current time 114 equals the timer 122 or a user acceptance is not received, the accept flag 248 is set to false. In Step 312, when a user acceptance is detected, the accept flag 248 is set to true. In Step 314, the respondent device identification 250 is set to the unique identification 134 of the respondent wireless communication device 46. In Step 316, the reply message 50 is sent from the respondent wireless communication device 46. In Step 318, the timer 122 is cancelled. The process then exits.

The present invention as described herein also includes an apparatus and method for indicating when the on-call wireless communication device 42 moves outside a specified region, the on-call area. When the on-call wireless communication device 42 moves outside the on-call area, the response time of the on-call device user 70 to the message 34 can be longer than desired by the call originator 12 such as the patient 11. The detection and notification of the location of the wireless communication device 32 can be done by either the wireless communication device 32 itself, or the on-call server 76 and the system controller 24 using information received from the RF transmitters. For example, in a wireless communication system using the ReFLEX protocol, each transmitter is assigned a 'Color Code', which is embedded in the frame synchronization word broadcasted to the plurality of wireless communication devices 40. A wireless communication device can determine its relative location by comparing the current color code against an earlier color code. Similarly, in the GSM protocol, the Base Identification Code (BSIC) broadcasted on the SCH of every cell allows a mobile station to distinguish among neighboring cells.

It will be appreciated by one of ordinary skill in the art that the wireless on-call communication system 10, in accordance with the present invention, can determine the location of the plurality of wireless communication devices using the systems mentioned above or an equivalent.

Figure 17:
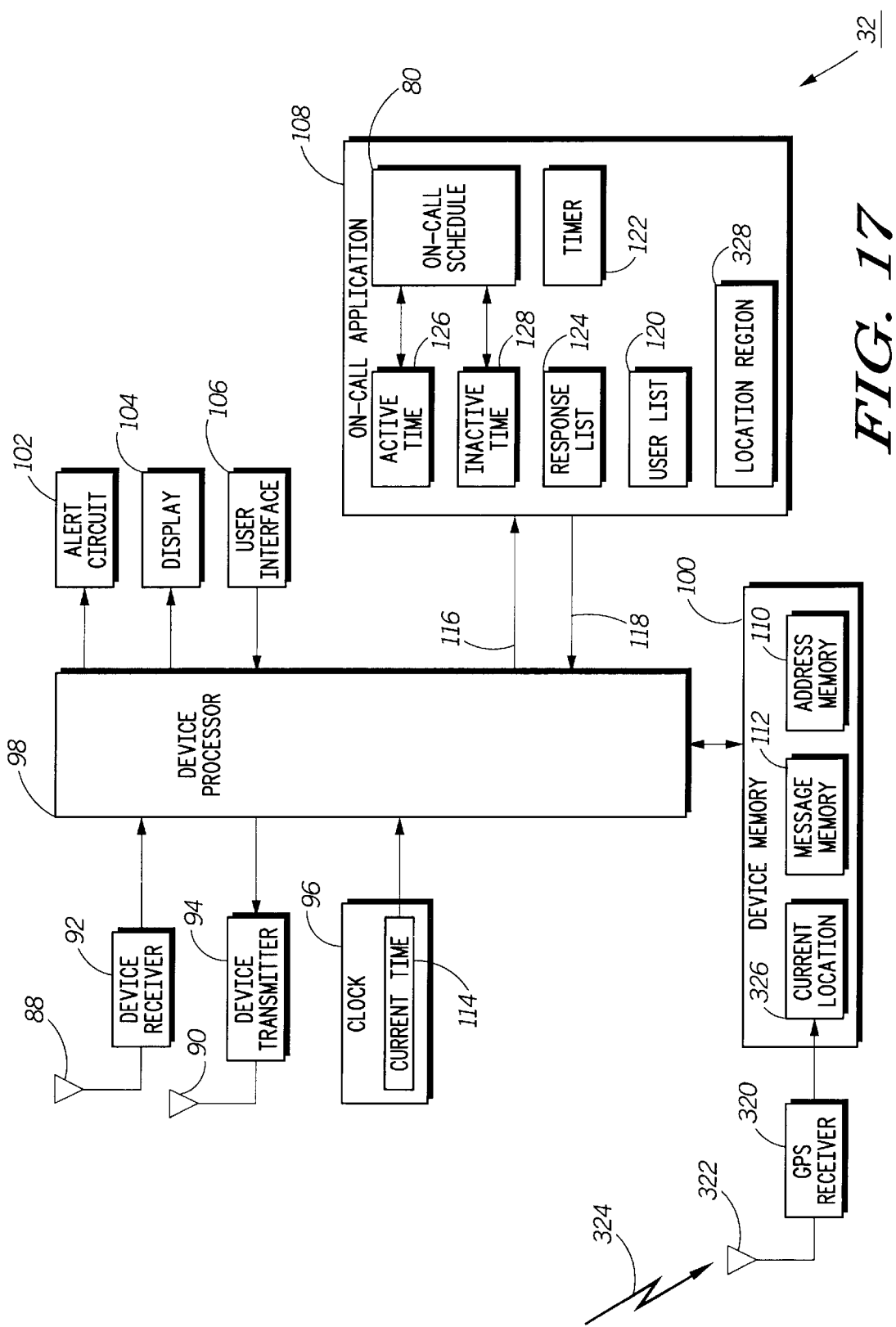
FIG. 17 is an electronic block diagram of an alternative embodiment of the wireless communication device of FIG. 2.

FIG. 17 is an alternate embodiment of the wireless communication device 32 of FIG. 2 for use in identifying the location of the wireless communication device 32. The reference numbers of the embodiment of FIG. 2 have been retained for those elements that are common. The wireless communication device 32 includes all the elements and functionality illustrated in FIG. 2 and further comprises a global positioning satellite (GPS) receiver 320 and GPS antenna 322.

The Global Positioning System (GPS) is a worldwide radio-navigation system formed from a constellation of 24 satellites and their ground stations. GPS uses these "man-made stars" as reference points to calculate positions accurate to a matter of meters. The GPS receiver 320 uses the satellites in space as reference points for locations here on earth. The GPS receiver 320 measures distance using the travel time of radio signals. The GPS receiver 320 has very accurate timing to measure travel time. Along with distance, the GPS receiver 320 knows exactly where the satellites are in space. Finally the GPS receiver 320 corrects for any delays the signal experiences as it travels through the atmosphere.

The GPS receiver 320 receives a plurality of signals 324 via the GPS antenna 322 corresponding to a current location 326. The GPS receiver 320 is coupled to the device memory 100 and stores the current location 326, determined from the processing of the plurality of signals 324, in the device memory 100 for later use by the on-call application 108. The GPS receiver 320 provides an accurate method for the wireless communication device 32 to determine its current location 326.

In the wireless communication device of FIG. 17, the on-call application 108 further includes the location region 328. Upon receipt and storage of the current location 326, the device processor 98 sends the processor command 116 to the on-call application 108 including the current location 326. The on-call application 108 compares the current location 326 with the location region 328 and sends the on-call application response 118 accordingly. For example, when the current location 326 is within the location region 328, the on-call application 108 can do nothing further. When the wireless communication device 32 is the on-call wireless communication device 42, and the current location 326 is outside of the location region 328, the on-call application 108 can send the on-call application response 118 to the device processor 98 indicating the on-call device user 70 is outside the location region 328. For example, when the on-call device user 70 is outside the location region 328, the on-call device user 70 can not necessarily respond effectively to messages.

Figure 18:
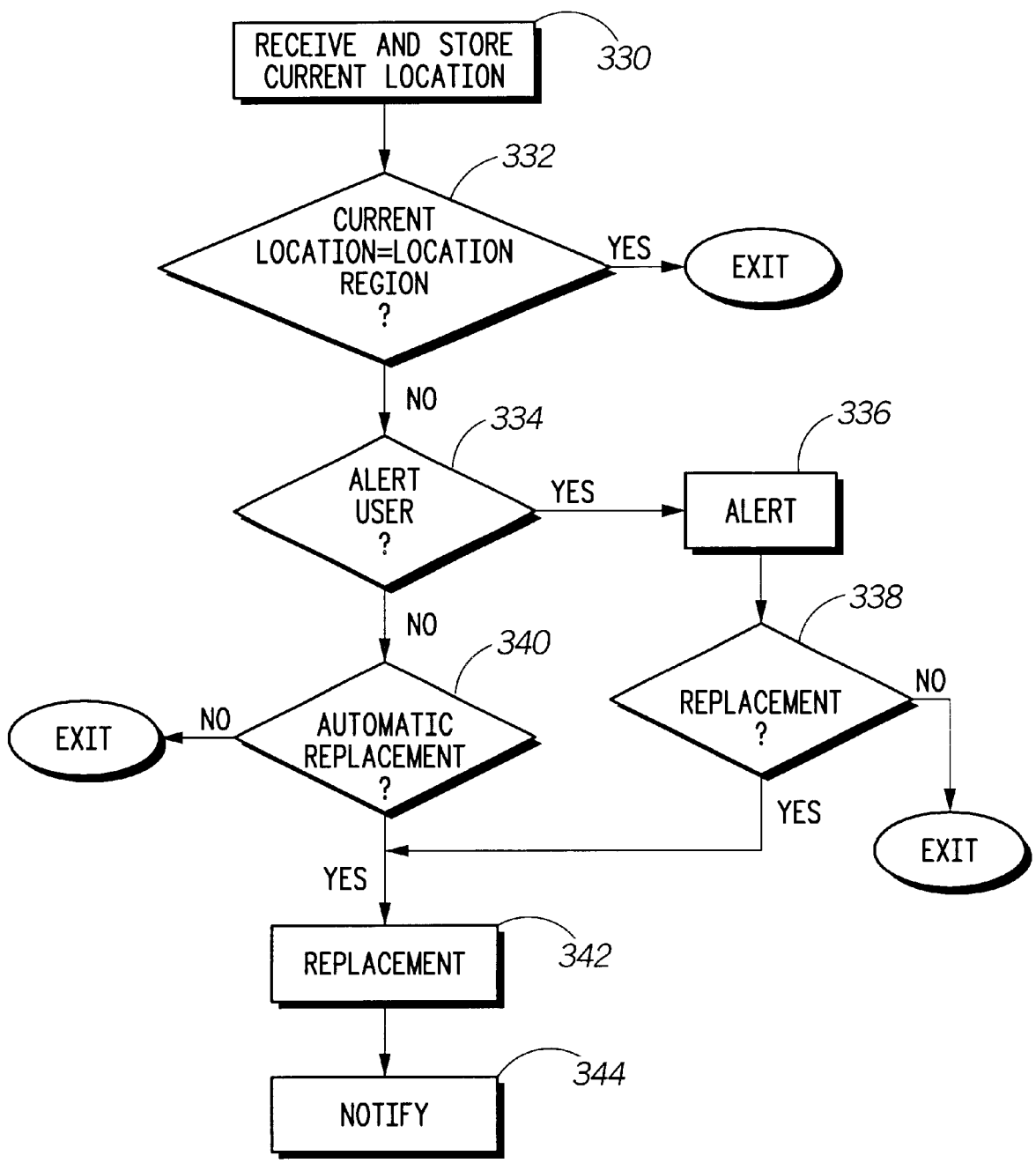
FIG. 18 is a flowchart illustrating the operation of the wireless communication device of FIG. 17 in accordance with the present invention.

FIG. 18 is a flowchart illustrating the operation of the wireless communication device 32 of FIG. 17. In the operation of FIG. 18, the wireless communication device 32 is the on-call wireless communication device 42. In Step 330, the on-call wireless communication device 42 receives the current location 326 and stores the current location 326 in the device memory 100. In Step 332, the current location 326 is compared to the location region 328. Preferably, the device processor 98 retrieves the current location 326 from the device memory 100 and sends the processor command 116 to the on-call application 108 including the current location 326 to the on-call application 108. The on-call application 108 then compares the current location 326 to the location region 328. When the current location 326 matches the location region 328, the process exits. When the current location 326 does not match the location region 328, the on-call wireless communication device 42 (the on-call device user 70) has moved outside of the geographic area where it can receive calls. In Step 334, when the current location 326 does not match the location region 328, the on-call application 108 determines if the alert feature has been chosen. In Step 336, when the alert is chosen, the device alerts the on-call device user 70 to that fact. Preferably, the device processor 98 sends a command to the alert circuit 102 to notify the on-call device user 70. The notification can be playing melodies and other audible alerts, a physical vibration, or a visual alert. It will be appreciated by one skilled in the art that other notifications or any combination of the audible, vibratory, and visual alerts described can be used for the notification. Next, the device processor 98 sends a command to the display 104 to generate a visual notification. When the display 104 receives the command from the device processor 98, an indication is displayed.

In Step 338, the device processor 98 determines whether the on-call device user 70 requests a replacement. When no replacement is requested, the process exits. For example, the on-call device user 70 can return to the on-call area in response to the alert. In Step 340, the process determines whether an automatic replacement option is chosen. When no automatic replacement is chosen, the process exits. In Step 342, when an automatic replacement option is chosen or the on-call device user 70 requests a replacement, the system finds and completes the replacement as described previously. In Step 344, the system notifies the on-call device user 70 when the replacement wireless communication device 47 is active.

Figure 19:
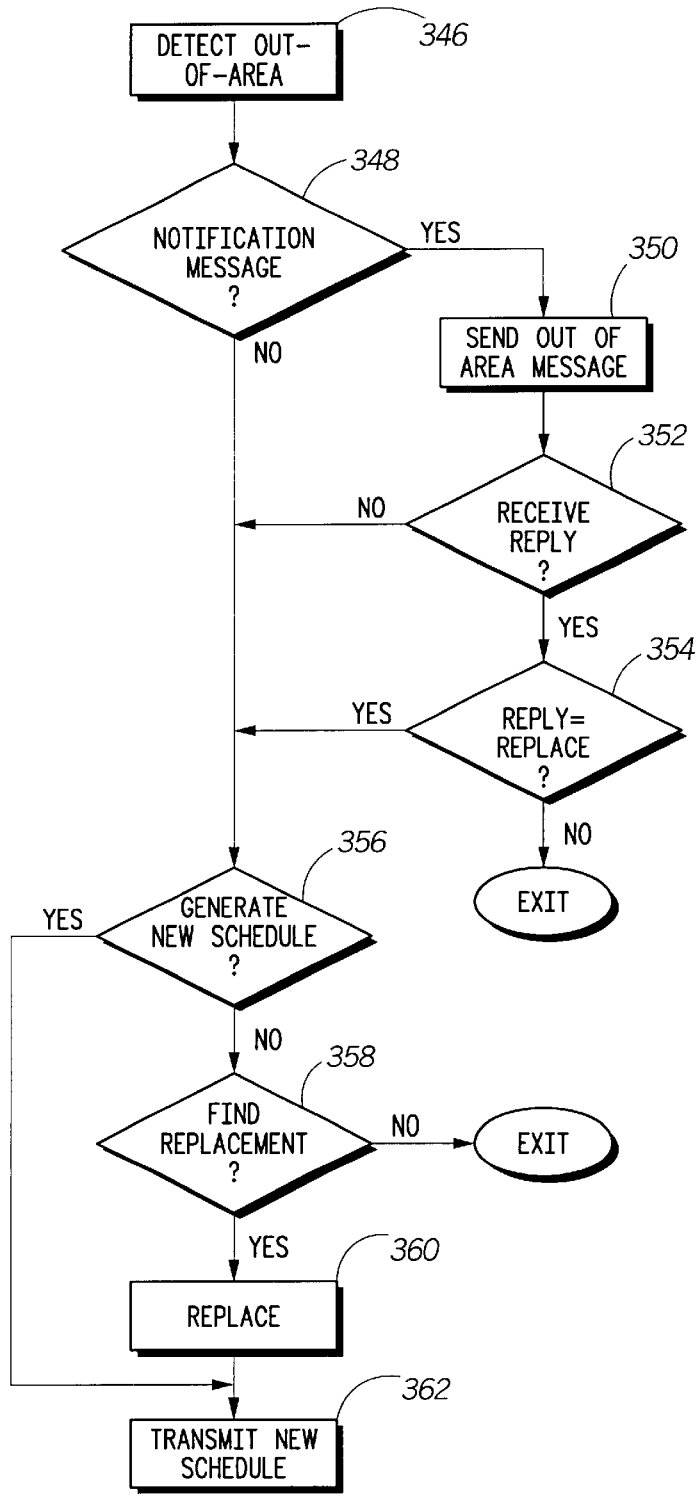
FIG. 19 is a flowchart illustrating the operation of the wireless on-call communication system of FIG. 1 in accordance with the present invention.

FIG. 19 is a flowchart illustrating an alternative method for managing the location of the on-call wireless communication device 42. FIG. 19 illustrates the operation of the on-call server 76 within the wireless on-call communication system 10. In Step 346, the on-call server 76 detects that the on-call wireless communication device 42 has moved outside the on-call area. In Step 348, the on-call server 76 determines whether it is programmed to send the message 34 to the on-call device user 70 via the on-call wireless communication device 42 or alternatively via an alternate communication means, questioning whether a return to the on-call area is possible, or if a replacement is needed. In Step 350, when the message 34 is desired, the on-call server 76 sends the message to the on-call wireless communication device 42. In Step 352, the on-call server 76 periodically checks for the reply message 50 from the on-call wireless communication device 42. In Step 354, when the reply message 50 has been received, the on-call server 76 determines whether the reply message 50 includes a request for replacement. When no request for replacement is detected, the process exits. In Step 356, when no change notification message 54 is required in Step 348, or when no reply message 50 is received in Step 352, or when the reply message 50 including a replacement is received in Step 354, the on-call server 76 next determines whether it is programmed to generate a new on-call schedule 80. In Step 358, when the on-call server 76 is not programmed to generate a new on-call schedule 80, the on-call server 76 determines whether it is programmed to find a replacement. When it is not programmed to find a replacement, the process exits. In Step 360, when it is programmed to find a replacement, the on-call server 76 determines a replacement per the methods previously described herein. In Step 362, when a replacement is located or a new on-call schedule 80 is generated, the on-call server 76 generates the new on-call schedule 80 as previously described herein. Preferably, the replacement wireless communication device 47 is programmed (codeplug option or user-programmable) as a temporary on-call wireless communication device, and when the on-call wireless communication device 42 moves back into the on-call area, it can resume its on-call function by automatically broadcasting the proper transfer commands.

In summary, the present invention as described in FIGS. 17 to 19 includes a method for assuring on-call coverage when the on-call wireless communication device moves outside the on-call area. The detection and notification that the on-call wireless communication device has moved outside the on-call area can be accomplished by either the wireless communication device itself, or by the on-call server through the wireless on-call communication system.

The present invention as described herein permits the removal of the answering service middle layer in an on-call system, allowing a more efficient process with shorter response times. In the alternative, when the answering service is desired as a system administrator, the present invention improves the efficiency of the answering service by reducing associated response times. In addition, its flexibility allows changes and variations in on-call responsibilities, without requiring a complex communicative process. Finally, the invention allows freedom of movement to device users, while ensuring that the on-call responsibilities are covered at all times.

Although the invention has been described in terms of preferred embodiments, it will be obvious to one skilled in the art that various alterations and modifications can be made without departing from the invention. Accordingly, it is intended that all such alterations and modifications be considered as within the spirit and scope of the invention as defined by the appended claims.

What is claimed is:

1. A wireless on-call communication system for management of on-call messages, the wireless on-call communication system having a plurality of wireless communication devices including an on-call wireless communication device and a replacement wireless communication device, wherein the on-call wireless communication device is active and the replacement wireless communication device is inactive, the wireless on-call communication system comprising:

an on-call server for managing an on-call schedule;

a system controller coupled to the on-call server for generating an on-call message in response to a server command from the on-call server;

at least one radio frequency transmitter coupled to the system controller for transmitting the on-call message to the plurality of wireless communication devices including the on-call wireless communication device and the replacement wireless communication device, wherein the on-call wireless communication device is inactive in response to receiving the on-call message and the replacement wireless communication device is active in response to receiving the on-call message; and at least one radio frequency receiver coupled to the system controller for receiving a change notification message sent from the on-call wireless communication device and communicating the change notification message to the system controller, wherein the system controller communicates the change notification message to the on-call server, and further wherein the server command is generated by the on-call server in response to the receipt of the change notification message.

2. In a wireless on-call communication system having a plurality of wireless communication devices, a query protocol for communicating an on-call message, the query protocol comprising:

an address portion, wherein the address portion comprises a message address; and a data portion, wherein the data portion comprises:
a system information control flag,
a message type,
an on-call device identification,
a repeat flag,
an accept flag, and
a respondent device identification.

3. In a wireless communication device for receiving and processing an on-call message, the wireless communication device including a message memory for storing the on-call message, an address memory for storing a plurality of addresses and a plurality of identifications, and an on-call application having an on-call schedule, a method for processing the on-call message comprising:

receiving the on-call message including an address portion and a data portion, wherein the address portion comprises a message address, and further wherein the data portion comprises a message identification, a system information control flag, and a message data;

matching the message address with one or more addresses stored in the address memory;

matching the message identification with one or more identifications stored in the address memory;

storing the message data of the on-call message in the message memory when the system information control flag is false; and modifying the on-call schedule using the message data of the on-call message when the system information control flag is true.

4. In a wireless on-call communication system having an on-call server for managing an on-call schedule, at least one radio frequency transmitter for transmitting an on-call message including the on-call schedule, and a plurality of wireless communication devices including an on-call wireless communication device and a replacement wireless communication device, wherein the on-call wireless communication device is active and the replacement wireless communication device is inactive, a method for management of on-call messages comprising:

generating a change to the on-call schedule by the on-call server;

transmitting the on-call message including the change to the on-call schedule by the radio frequency transmitter to the plurality of wireless communication devices;

deactivating the on-call wireless communication device; and activating the replacement wireless communication device.

5. A method for managing on-call messages in a wireless on-call communication system as recited in claim 4, wherein the wireless on-call communication system further comprises at least one radio frequency receiver for receiving a reply message, the method further comprising:

receiving the reply message by the on-call server prior to the deactivating step.

6. In a wireless communication device for receiving and processing an on-call message, the wireless communication device including a message memory for storing the on-call message, an address memory for storing a group address and a unique identification, and an on-call application having an on-call schedule, a method for processing the on-call message comprising:

receiving the on-call message including an address portion and a data portion, wherein the address portion comprises a message address, and further wherein the data portion comprises a message identification, a system information control flag, an on-call flag and a message data, wherein the system information control flag is set to true;

matching the message address with the group address stored in the address memory;

matching the message identification with the unique identification stored in the address memory; and activating the wireless communication device when the on-call flag is set to true.

7. In an on-call wireless communication device having a receiver for receiving and processing a reply message, a device transmitter for transmitting a query message, an address memory for storing a group address and a unique identification, and an on-call application for activating and deactivating the on-call wireless communication device, a method for deactivating the on-call wireless communication device comprising:

transmitting the query message;

receiving a reply message from a respondent wireless communication device; and deactivating the on-call wireless communication device in response to receiving the reply message.

8. A method for deactivating an on-call wireless communication device as recited in claim 7 wherein the query message includes a message address, a system information control flag, a message type, and an on-call device identification, wherein the message address is the group address, wherein the system information control flag is set to true, wherein the message type is set to query, and further wherein the on-call device identification is the unique identification stored in address memory.

9. A method for deactivating an on-call wireless communication device as recited in claim 7 wherein the reply message includes a message address, a system information control flag, a message type, an on-call device identification, an accept flag, and a respondent device identification, wherein the message address is the group address, wherein the system information control flag is set to true, wherein the message type is set to query, wherein the on-call device identification is the unique identification, wherein the accept flag is set to true, and further wherein the respondent device identification is the unique identification of the respondent wireless communication device.

* * * * *